(12) United States Patent
Spector et al.

(10) Patent No.: US 7,516,110 B2
(45) Date of Patent: Apr. 7, 2009

(54) EXPERT SYSTEMS

(75) Inventors: Ian Charles Spector, Amersham (GB);
Marcella Linn Thiel, Amersham (GB);
Michael Douglas Alban Thompson,
Aylesbury (GB)

(73) Assignee: Expert-24 Ltd., Amersham (GB)

( * ) Notice: Subject to any disclaimer, the term of this patent is extended or adjusted under 35 U.S.C. 154(b) by 583 days.

(21) Appl. No.: 11/342,244

(22) Filed: Jan. 27, 2006

(65) Prior Publication Data
US 2006/0200371 A1 Sep. 7, 2006

(30) Foreign Application Priority Data
Jan. 28, 2005 (EP) .................................. 05250441

(51) Int. Cl.
*G06N 5/00* (2006.01)
(52) U.S. Cl. .......................................... 706/45; 706/47
(58) Field of Classification Search .................... 706/45, 706/47
See application file for complete search history.

(56) References Cited

U.S. PATENT DOCUMENTS 5,191,548 A * 3/1993 Balkanski et al. ........... 708/402
5,196,946 A * 3/1993 Balkanski et al. ......... 358/426.02
5,200,993 A * 4/1993 Wheeler et al. .......... 379/93.02

* cited by examiner

*Primary Examiner*—Wilbert L Starks, Jr.
(74) *Attorney, Agent, or Firm*—Knobbe, Martens, Olson & Bear, LLP

(57) ABSTRACT

A method of traversing a workflow is described. The workflow comprises a plurality of interconnected question and answer nodes, each question node being linked to a respective stored pre-determined question and each answer node being linked to a respective stored answer. The method comprises: determining the type of the current node of the workflow and, if the current node is a question node, accessing a data store, ascertaining whether the data store contains a previously determined answer to the question linked to the current question node and, a) if the data store does contain such a previously determined answer, retrieving the answer from the data store and using the retrieved answer to determine the next node of the workflow to be traversed; and b) if the data store does not contain such a previously determined answer, presenting the question linked to the current question node to a user, and using answer data obtained from the user to determine the next node of the workflow to be traversed.

75 Claims, 30 Drawing Sheets

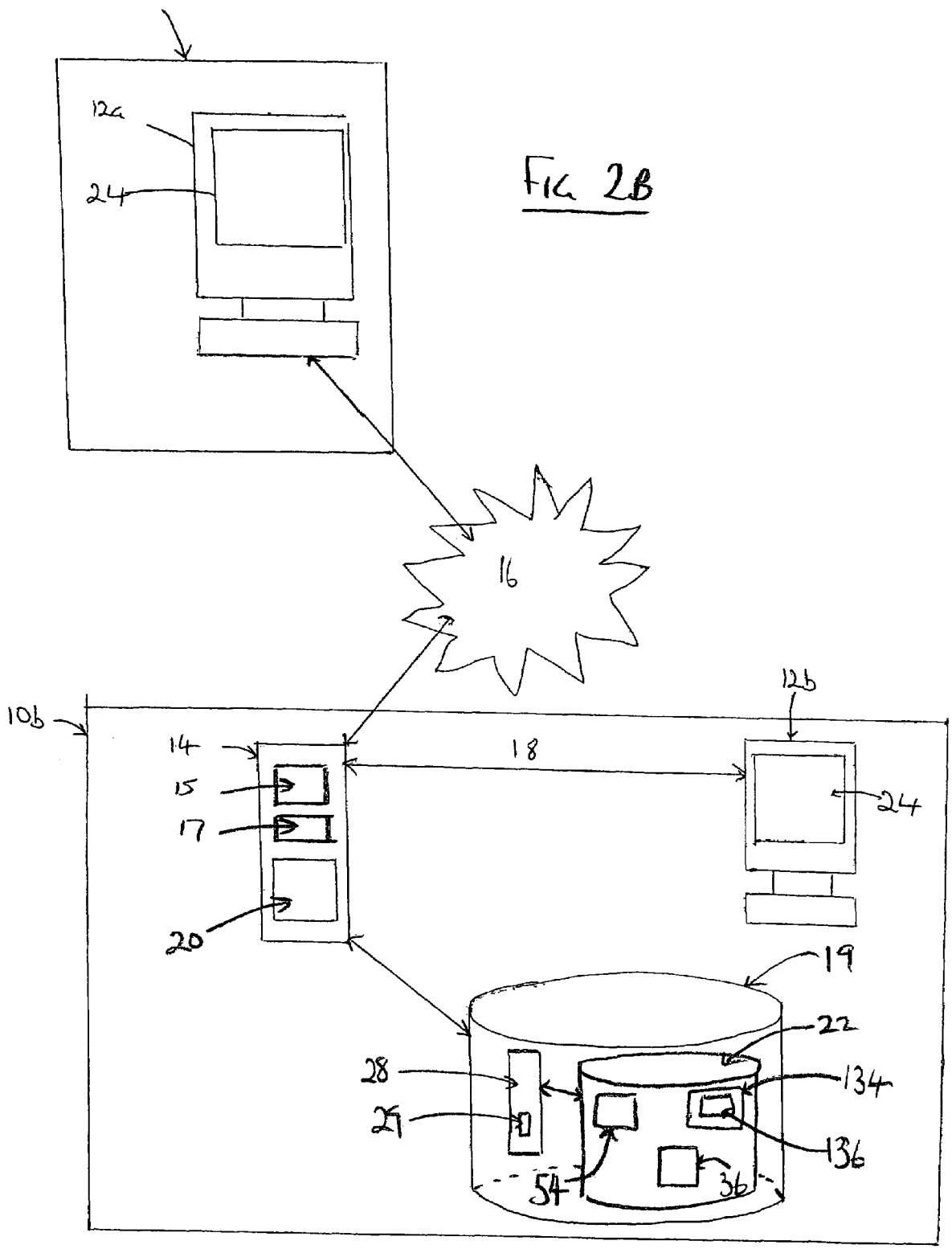

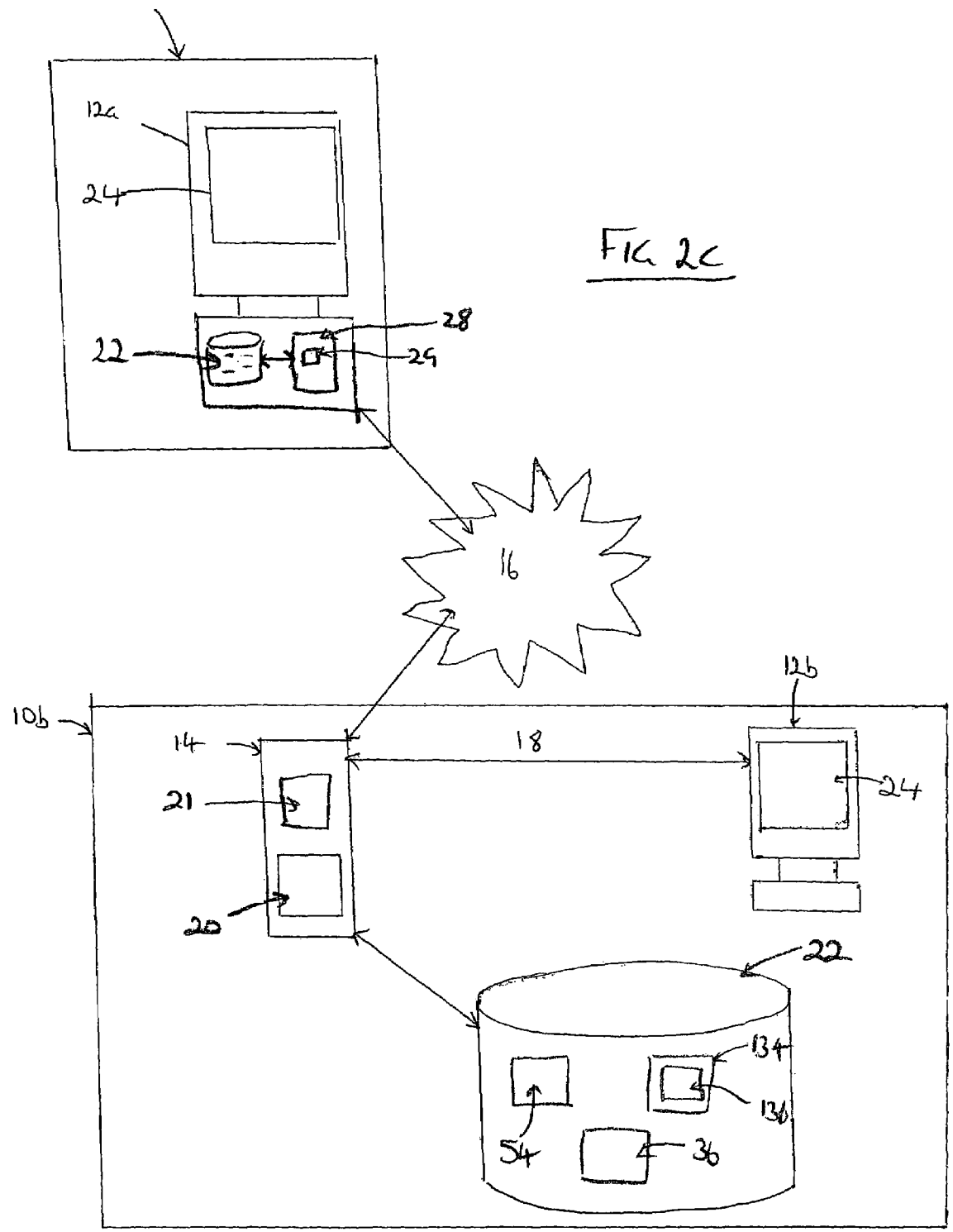

86

Symptom Assessment > Start Assessment

Symptom Assessment

Review my Answers    Back

Which of the following are currently present?

*Please select ALL answers that apply, and then click on 'Continue'.*
*Information known from medical history will be pre-answered.*

- Respiratory failure requiring intubation and mechanical ventilation
- Cardiac ischemia, confirmed or suspected
- Cardiogenic shock
- Acute myocardial infarction
- Acute pulmonary embolism
- Serious arrhythmia
- Anasarca
- Pulmonary edema
- Severe respiratory distress
- Syncope None of the above

Health Planner

Health Planner > Assessment Selection > Start Assessment

◁ Review my Answers    ◁ Back

DIET HISTORY:

*Please select ONE answer in each row and click on 'Continue'.*

On average, how many servings does he have of each of these types of food each DAY? (Click on the "i" icon for descriptions and serving size guidelines.).

|  | Less than 1 | 1 | 2 | 3 | 4 | 5 or more |
|---|---|---|---|---|---|---|
| ⓘ Fruit | ○ | ○ | ○ | ○ | ○ | ○ |
| ⓘ Vegetables | ○ | ○ | ○ | ○ | ○ | ○ |
| ⓘ Fatty foods | ○ | ○ | ○ | ○ | ○ | ○ |
| ⓘ Processed foods | ○ | ○ | ○ | ○ | ○ | ○ |

Health Planner       ⓘ Review my Answers    ⏴ Back

FAMILY HISTORY:

*Please select ALL answers that apply in each row, and then click on 'Continue'. Information known from medical history will be pre-answered.*

Which, if any, of your blood relatives have had the following condition(s):
(If 'none', leave the row blank).

| | Parent | Brother/sister | Grandparent | Aunt/uncle | Unknown |
|---|---|---|---|---|---|
| Heart attack, angina, or heart surgery | ☐ | ☐ | ☐ | ☐ | ☐ |
| ⓘ Familial hyperlipidaemia (a confirmed genetic disorder causing extremely high cholesterol levels). | ☐ | ☐ | ☐ | ☐ | ☐ |
| Breast cancer | ☐ | ☐ | ☐ | ☐ | ☐ |
| ⓘ Bowel cancer | ☐ | ☐ | ☐ | ☐ | ☐ |
| Diabetes | ☐ | ☐ | ☐ | ☐ | ☐ |

| | | Node and Connector IDs | | | Asset IDs | | | |
|---|---|---|---|---|---|---|---|---|
| ID | Node Type | Data 1 | Data 2 | Node Name (& ID) | Algo | Question | Answer | Transfer | Conclusion |
| 1 | Start | | | Start (1) | 2598 | 0 | 0 | 0 | 0 |
| 2 | Question | | | Question (2) | 0 | 4500 | 0 | 0 | 0 |
| 3 | Answer | | | Answer1 (7) | 0 | 0 | 5738 | 0 | 0 |
| 4 | Answer | | | Answer2 (8) | 0 | 0 | 5739 | 0 | 0 |
| 5 | Answer | | | Answer3 (9) | 0 | 0 | 5740 | 0 | 0 |
| 6 | Answer | | | Answer4 (10) | 0 | 0 | 5741 | 0 | 0 |
| 7 | Transfer | | | Transfer (23) | 2583 | 0 | 0 | 2635 | 0 |
| 8 | Conclusion | | | Conclusion (24) | 0 | 0 | 0 | 0 | 3980 |
| 9 | Stop | | | Stop | 0 | 0 | 0 | 0 | 157 |
| 10 | Message | | | Message (25) | 0 | 3745 | 0 | 0 | 0 |
| 11 | | Start | Question | Dynamic Connector | 0 | 0 | 0 | 0 | 0 |
| 12 | | Question | Answer1 | Dynamic Connector (112) | 0 | 0 | 0 | 0 | 0 |
| 13 | | Question | Answer2 | Dynamic Connector (113) | 0 | 0 | 0 | 0 | 0 |
| 14 | | Question | Answer3 | Dynamic Connector (114) | 0 | 0 | 0 | 0 | 0 |
| 15 | | Question | Answer4 | Dynamic Connector (115) | 0 | 0 | 0 | 0 | 0 |
| 16 | | Answer1 | Transfer | Dynamic Connector (116) | 0 | 0 | 0 | 0 | 0 |
| 17 | | Answer2 | Conclusion | Dynamic Connector (117) | 0 | 0 | 0 | 0 | 0 |
| 18 | | Answer3 | Stop | Dynamic Connector (118) | 0 | 0 | 0 | 0 | 0 |
| 19 | | Answer4 | Message | Dynamic Connector (119) | 0 | 0 | 0 | 0 | 0 |
| 20 | | Transfer | Next Node | Dynamic Connector (120) | 0 | 0 | 0 | 0 | 0 |
| 21 | | Conclusion | Next Node | Dynamic Connector (121) | 0 | 0 | 0 | 0 | 0 |
| 22 | | Message | Next Node | Dynamic Connector (122) | 0 | 0 | 0 | 0 | 0 |

81

| Algo | Node ID | Asset ID | Next Node ID | Next Node Type |
|---|---|---|---|---|
| 2598 | 1 | 2598 | 2 | Start |
| 2598 | 2 | 4500 |  | Question |
| 2598 | 2 | 5738 | 7 | Answer |
| 2598 | 2 | 5739 | 8 | Answer |
| 2598 | 2 | 5740 | 9 | Answer |
| 2598 | 2 | 5741 | 10 | Answer |
| 2598 | 7 | 2583 | 23 | Transfer |
| 2598 | 8 | 3980 | 24 | Conclusion |
| 2598 | 9 | 157 | 0 | Stop |
| 2598 | 10 | 3745 | 25 | Message |

Fig. 8d

Review and Confirm Answers  ◁ Back

Please review and confirm your answers below, if you DISAGREE with an answer, simply click on that answer to review or change it. When all of the answers are correct, click on the 'Confirm' button at the bottom of the list to advance to your recommendations.

You are a 30 year old woman with lower back pain

Problem identification - click on an answer to change it

*Problem*
- Back pain

Current history - click on an answer to change it

*Possible Emergency Indicators*
- None
- No sudden and excruciating ripping or stabbing pain
- No new loss of bowel or bladder function
- No new and continuous weakness of the lower limb(s)
- No new and continuous numbness in the groin or saddle area

*Symptoms*
- No radiating pain
- No numbness or tingling
- No fever present
- No unintentional weight loss
- No night sweats
- No pain on passing urine
- No worsening of pain at night
- No typical common cold or "flu" symptoms
- No pain on one side of the back just below the ribcage, or reaching around into the groin

Social history or lifestyle - click on an answer to change it

*Exercise*
- None
- No regular exposure to activities that involve twisting and/or stretching

*Occupations and exposures*
- Physical demands of employment or every day activities: No lifting or have a sedentary job or lifestyle

Evaluation - click on an answer to change it

*Consultations*
- None
- No previous diagnosis given by a doctor for this problem Last updated: October 24, 2003

◁ Back   🖨 Print                    Confirm ▷

Fig. 18

Conclusion  @ Back

[Your lower back pain should improve with home treatment]

Reason

*Possible low back strain of recent onset*
You may have strained or pulled a muscle or ligament in your lower back. This is the most common cause of lower back pain. Studies have shown that the majority of all back pain goes away within 6 weeks, regardless of treatment. X-rays are not routinely indicated. If the pain does not improve with rest and home treatment measures within a few... More

*Need for improved working practices and workstation or desk set-up*
A good set-up of your workstation and good working practices may both prevent and help relieve back, neck, shoulder, arm and wrist pain. In addition to the recommendations in the diagram below, consider the following points:

1. Use a good chair with a dynamic back (supporting the small of the back) and recline slightly in the chair... More Encyclopaedia Links: Safety and health at work,
*Care Points*
The following advice may help to relieve your symptoms:
1. Ice and heat are traditional therapies for back pain. Their value is not yet proven but many people find them helpful. General recommendation for injuries is to use ice instead of heat during the first 24 to 48 hours, and then use heat or alternate both as needed thereafter.

10. You should see a doctor if severe pain does not improve within 3 days, if the pain keeps you off work for more than 3 days or does not resolve within 1 month.

Additional Information

*Preventing back pain*
Many cases of back pain can be avoided. Pain may be caused by poor posture, muscle strain or weak abdominal or back muscles. Back injuries can be caused by incorrect lifting which can be acute or chronic. Many lifting injuries are caused by... More Encyclopaedia Links: Lower back pain, ——— 219

*References for lower back pain*
The information used to prepare these assessments comes from a wide range of medical literature, using the best evidence-based information available. Where rigorous evidence-based information is lacking, peer reviewed medical literature and texts... More

Fig. 19

EXPERT SYSTEMS

TECHNICAL FIELD

The present invention concerns improvements relating to expert systems. The present invention has many application areas including, but not limited to, medicine, finance, and insurance.

BACKGROUND ART

The United Kingdom has a publicly funded national health service (NHS) which dates back to the late 1940s. Due to the increase in the UK's population from that time, and significant changes in the population's diet and lifestyle, the NHS is experiencing an increasing amount of strain on its resources. This has resulted in a shortage of family doctors due to problems in recruitment and retention of staff. Other serious staffing problems can be seen with the recruitment and retention of other staff such as nurses, midwives and radiographers. One consequence of the recruitment/retention problem is that overstretched NHS staff are far more likely to make mistakes which lead to litigation and huge sums for damages which the health service has to pay for. Another consequence is that thousands of family doctors have closed their lists to new patients because they can no longer safely increase their workloads. People with minor ailments who are not able to register with a family doctor, or who are not willing or able to wait days for an appointment, are seeking medical attention in hospital accident and emergency departments. This, of course, further increases the burden on overstretched NHS hospitals.

To address the above problems the NHS has developed the free service "NHS Direct Online" (www.nhsdirect.nhs.uk). This service provides access to an online health encyclopaedia and a self-help guide to help diagnose certain symptoms a user may have. The self-help guide asks the user one or more questions to which the answer may be "yes" or "no", and then provides advice based on the user's answers. For example, the service may advise a user to dial for an ambulance, to call the NHS direct telephone service to speak to a medically qualified person, to make an appointment with a family doctor, or it may give the user general care advice to deal with their symptoms. Although it can be useful in some circumstances, the NHS direct service does not provide an efficient method for diagnosing a user's symptoms. This is because the service has no prior knowledge of the user (for example, it does not know whether the user is male or female), and it does not provide a user with the capability of giving anything other than "yes/no" answers.

Another solution to the aforementioned problems may be provided by "expert systems". Expert systems are a class of computer programs developed by researchers in artificial intelligence during the 1970s, and applied commercially throughout the 1980s. Essentially, an expert system is a program which comprises a set of rules that analyse information (usually supplied by an end-user) about a specific set of problems, and to recommend a course of action (i.e. to give expert advice).

An expert system typically comprises two main components: a knowledge base and a reasoning or inferencing engine. The knowledge base contains knowledge which may be represented, for example, both as facts and rules (such systems being known as "rule-based" expert systems). The inference engine of the expert system uses the knowledge in the knowledge base to construct a line of reasoning leading to the solution of the problem. This line of reasoning may be implemented using a tree structure. An example of a binary tree 1 for evaluating a user's symptoms is shown in FIG. 1. The binary tree 1 comprises two sets of hierarchically arranged nodes: a first set 2, 4 and 6 which represents the questions to be answered by the user, and a second set 3, 5 and 7 which represents the possible answers which may be given to those questions. In this example, the user is asked three questions 2, 4 and 6 ("Do you have a headache?", "Are you taking medication?", and "Is your vision disturbed?") to which "yes/no" answers 3, 5 and 7 may be given. It can be seen from this tree 1 that the three questions 2, 4 and 6 lead to eight (i.e. $2^k$ where k=number of questions) possible pathways through the binary tree 1 to give eight possible different question/answer combinations. The different questions/answer combinations can be used to arrive at conclusions 8 about the user's symptoms. In this binary tree 1, three different conclusions 8 may be arrived at. For example, a user who has a headache and disturbed vision, but is not taking medication may have a migraine headache. A user who has a headache, but who is not taking medication and does not have disturbed vision may have a tension headache. Alternatively, a user who has a headache and disturbed vision, and who is also taking medication may be experiencing side-effects of the medication.

An expert system may be built by translating such a decision tree into another suitable format such as a library of IF-THEN rules. The above described tree yields eight such rules. One of these rules is "IF the user has a headache, AND the user is taking medication AND the user has disturbed vision, THEN consider that the user may be experiencing side effects of their medication". One problem with the binary tree format is the potential size of the tree. As mentioned above, the number of possible pathways through the decision tree is $2^k$ where k is the number of questions in the tree. It is easy to see that the size of the tree will be extremely large for a complex medical problem requiring many questions to arrive at a conclusion, and thus will be computationally and programmatically expensive to implement.

Another problem with traditional rule-based expert systems is that it is sometimes difficult to obtain a correct set of rules and/or a decision tree. There are several reasons for this. Firstly, it may take a long time for an expert to provide knowledge to a computer programmer who is building the expert system if the rule is difficult to construct using natural language. Secondly, even though an expert provides the computer programmer with the expert knowledge, it may be difficult for the programmer to fully understand this knowledge and to produce an expert system which gives the correct expert advice. Due to these reasons the use of traditional rule-based expert systems is not as widespread as it was in the 1980s. Another reason why the use of expert systems in general is not very common is that traditional expert systems have narrow knowledge domains. That is, they are usually problem-specific. Furthermore, there are generally three individuals (or groups of individuals) who need to interact with the expert system: 1) the end-user(s) who uses the system for its problem solving/expert advice capability; 2) the problem domain expert(s) who builds the knowledge base; and 3) the knowledge engineer/computer programmer who assists the expert in determining the representation of their knowledge and who defines the inference technique required to obtain useful problem solving activity. It is likely, especially in the medical field, that the problem domain expert(s) will not be able to carry out the knowledge engineering/computer programming function, and vice versa. This means that a relatively large team of people may be required to build such an expert system, which leads to high costs.

An aim of the present invention is therefore to provide a method and system for providing expert advice which overcomes or substantially reduces at least some of the above mentioned problems with existing expert systems.

SUMMARY OF THE INVENTION

According to a first aspect of the invention there is provided a method of traversing a workflow, the workflow comprising a plurality of interconnected question and answer nodes, each question node being linked to a respective stored pre-determined question and each answer node being linked to a respective stored answer, the method comprising: determining the type of the current node of the workflow and, if the current node is a question node, accessing a data store, ascertaining whether the data store contains a previously determined answer to the question linked to the current question node and, a) if the data store does contain such a previously determined answer, retrieving the answer from the data store and using the retrieved answer to determine the next node of the workflow to be traversed; and b) if the data store does not contain such a previously determined answer, presenting the question linked to the current question node to a user, and using answer data obtained from the user to determine the next node of the workflow to be traversed.

The method may implement an expert system to give expert advice to the user, the interconnected nodes representing a plurality of rules. The pathway taken through the interconnected nodes is determined by the answers given to the questions (whether or not the question is presented to the user for answering), which in turn determines the advice given to the user. The answer given to a question also determines the next question that is asked (whether of the user directly or of the data store). The method may implement, for example, a health assessment, where the questions relate to a person's health and symptoms.

The present invention provides a method of traversing a workflow in which answer data is stored in a data store such that it can be re-used in the event that the same question is encountered later in the workflow. In the method according to the present invention, as a question node is encountered the data store is accessed and a determination is made as to whether the data store contains a previously determined answer relating to the question.

If a predetermined answer is present in the data store this answer is used to determine the next node in the workflow. If an answer is not present in the data store then the user is presented with the question.

If a predetermined answer is present in the data store then the question will be answered without the need to involve the user. Such a question can therefore be regarded as a "silent" question.

The method according to the present invention allows the workflow to be designed more efficiently than in prior art systems. As noted above, prior art expert systems utilise tree structures for constructing a line of reasoning leading to a solution. A known problem with such systems is the potential size of the tree that is required. Every potential pathway from the problem to the solution needs to be incorporated into the tree and this results in an extremely complex structure and increases the possibility of errors appearing in the logic flow.

In the method of traversal according to the present invention however answers to questions presented to the user are stored within the data store. This allows questions to be repeated and helps to reduce the redundancy in the logic flow (This is because questions can be repeated which makes loop structures possible within the logic flow structure. This therefore eliminates the requirement to explicitly provide separate and distinct tree branches for each pathway through the workflow).

The method of traversal according to the present invention further allows serial loops representing If/Then logic constructs to be built in a workflow document which obviates the need for each possible point in a workflow document to have a unique chain of previous questions. This greatly reduces the size of the workflow document compared to prior art methods of constructing workflows.

Preferably the presenting step further comprises presenting the question and one or more associated pre-determined answers to the user for user-selection. The method may comprise the further step of creating a viewing page (such as a Web page or client-server application page) for presenting the question and associated answer(s) to the user and for obtaining answer data.

Different types of pre-determined answers may be presented to the user. For example, the answer may be a "yes/no" answer and may be presented to the user via two radio boxes, one representing "yes", the other representing "no". The answer could be a "one from many" answer where the user may select a single answer that applies to them. This could again be implemented by the use of radio boxes, or a drop-down menu, for example. Alternatively, the answer could be a "many from many" answer in which the user may select as many answers as apply. Other types of pre-determined answers may also be used, such as asking for the input of a numerical value or date value.

Alternatively, the presenting step may comprise simply presenting the question to the user enabling a free-text answer that is not predetermined. Free text can also form part of a future look-up to determine the next step in the workflow.

The method may further comprise creating a personal history record for the user at the data store prior to commencing the traversal of the workflow, the personal history record storing personal permanent or semi-permanent information regarding the user. The personal history record may then be used to store answer data given by the user prior to and/or during the traversal of the workflow. This answer data does not have to relate to the user him or herself. For example, if the method implements a health assessment, the user carrying out the health assessment may be a mother, and the health assessment data may relate to her child.

The step of storing answer data in the personal history record preferably further comprises linking the answer data given by the user with the question presented to the user to generate a question and answer pair, and storing the question and answer pair in the personal history record.

The data store may be remotely located from the user, in which case the storing step may further comprise transmitting the question and answer pair to the data store via a communications network, such as the Internet.

Alternatively, the data store may be located locally to the user, for example the user may be associated with a user terminal and the data store may be stored on the user terminal. In this case, workflows and question and answer data may be downloaded from a remotely located storage facility to the user terminal such that workflow traversal can take place on the user's terminal.

The step of accessing the data store preferably comprises matching the question associated with the current question node with the question of each question and answer pair in the personal history record and, if there is a match, the retrieving step comprises retrieving the answer linked to the question of the matching question and answer pair to determine the next node of the workflow to be traversed. In this manner, each question and answer pair can be used as an independent piece of data which can be reused during the traversal process if the same question is encountered again.

Preferably the workflow comprises at least one termination node connected to a respective at least one previous node, and the method further comprises repeating the determining, accessing, ascertaining and retrieving or presenting steps until a termination node is reached.

Preferably the workflow further comprises at least one conclusion node connected to a respective at least one previous node, each conclusion node being associated with a respective stored conclusion specifying information according to the pathway taken through the nodes during the traversal of the workflow. This information may comprise expert advice, the expert advice given depending on the answers given by the user to the questions presented to him or her during the traversal of the workflow.

During the traversal process, if the current node is a conclusion node, the method preferably further comprises storing the conclusion associated with the conclusion node in the personal history record. If the data store is located remote from the user, the method may also comprise the further step of transmitting the conclusion to the data store via a communications network, such as the Internet.

A question may comprise a conclusion check question for checking whether a conclusion node has been reached during the traversal process, and the method may further comprise referring to the personal history record to ascertain whether it contains a pre-stored conclusion in order to determine the next node of the workflow to be traversed. This allows reference to complex logical conclusions by referencing their outcome (e.g. "High risk of heart disease") in future logic so that the question/answer sequence used to come to this conclusion need not be repeated. These conclusions may be either silent or presented to the user. The power of this functionality enables large sections of logic to be represented by a single conclusion in further logic.

The workflow may include at least one message node connected to a respective at least one previous node such that if the current node is a message node, the method may comprise sending a message to the user prior to the termination of the traversal of the workflow. This may be useful in the following circumstance. If a conclusion is reached during a symptom assessment that a child needs to immediately wash out his eye in the shower, but the traversal process needs to continue on after he does so, there is a risk that the traversal process may be prematurely terminated or that it would have to be terminated to show the user this conclusion. The use of a message would enable the user to be informed of emergency steps needed as soon as they are reached without having to complete or terminate the entire symptom assessment.

The workflow preferably comprises a plurality of linked workflows. For example, in a health assessment, a first workflow may include questions relating to emergency symptoms, a second workflow (which is linked to, and referenced by, the first workflow) may include neurological questions, and a third workflow (which is linked to, and referenced by, the second workflow) may include questions about the cardiovascular system. This enables different workflows to be created by different people in different medical fields.

The workflow may further comprise at least one transfer node connected to a respective at least one previous node such that, if the current node is a transfer node, the method comprises terminating the traversal of the current (e.g. first) workflow and carrying out the traversal of another (i.e. second) workflow. The method may also comprise returning to the traversal of the previous (i.e. first) workflow on completion of the traversal of the current (i.e. second) workflow, if the traversal of the previous (first) workflow has not been completed.

Advantageously, a single pre-determined question or pre-determined answer may be associated with a plurality of question and answer nodes of the workflow(s). This enables questions and answers to be re-used in workflow, thereby reducing the size and complexity of the resulting expert system, and decreasing the time taken to produce the expert system. Additionally, a single conclusion may advantageously be associated with a plurality of conclusion nodes of the workflow(s).

The method may further comprise the step of creating a viewing (or summary) page comprising question and answer data from the personal history record for user-confirmation, and transmitting the viewing page to a client (for example a client-server system, a Web-browser, mobile phone or PDA). This enables a user to review the answers they have given to the questions presented to them.

The viewing page is preferably an editable data page, and the method preferably further comprises deleting an answer from the personal history record via the data page, and re-commencing the traversal of the workflow from the question node associated with the deleted answer. This advantageously enables the user to amend the answer data given during the traversal process and to enter correct answer data without the entire traversal process having to be completed again.

On the other hand, if the user is happy with the answers given by him or her during the traversal process, the method may further comprise receiving confirmation of this fact from the user, creating a viewing page comprising conclusion data from the personal history record, and transmitting the viewing page to the client (for example a client-server system, a Web-browser, mobile phone or PDA). As stated above, the conclusion data presented to the user will depend on the pathway taken through the interconnected nodes during the traversal process.

Preferably the workflow comprises a document containing a visual representation of the nodes and their interconnections, such as a Microsoft Visio drawing. This allows non-technical users to construct extremely complex expert systems themselves without needing any intermediary technical support.

Alternatively, the workflow may comprise a database table containing a representation of the nodes and their logic interconnections. The method may further comprise the step of converting the visual representation of the workflow to a database table prior to carrying out the traversal of the workflow.

According to a second aspect of the invention there is provided a system for traversing a workflow comprising a plurality of interconnected question and answer nodes, each question node being linked to a respective stored pre-determined question and each answer node being linked to a respective stored answer, the system comprising: display means for presenting a question to a user; traversal means arranged to retrieve a node of the workflow, to determine the type of the current node and, if the current node is a question node, to access a data store, and to ascertain whether the data store contains a previously determined answer to the question linked to the current question node and, a) if the data store does contain such a previously determined answer, to retrieve the answer and use the retrieved answer to determine the next node of the workflow to be traversed; and b) if the data store does not contain such a previously determined answer, to present the question linked to the current question node to the user via the display means, and to use answer data obtained from the user to determine the next node of the workflow to be traversed.

The system may further comprise a library of pre-determined questions, answers and conclusions which may be stored at the data store or at another location. Certain answer types only get used with certain question types. Outside of this, questions and answers are independent of each other and can be paired in any way. As mentioned above, each pre-determined question, answer and conclusion may be re-used in different workflows.

The system may have access to an electronic record to minimise the number of questions that have to be presented to the user. These questions may be silently answered by reading the data in the electronic record. Furthermore, data obtained during the traversal of a workflow document can be used to update the electronic record at the same time, thereby providing a more accurate view of the electronic record's history at all times.

The data store may be located remotely from the user. For example, the user may be associated with a user terminal which is located remotely from the traversal means and data store and the system may comprise a server computer which connects, via a communications network such as the Internet, to the user terminal. The server computer in turn may be operably connected to a data storage facility which comprises the data store.

The traversal means may be located on the server computer or alternatively may be incorporated within the data storage facility. The system may comprise a user terminal which is operably connected to a server computer In a first arrangement, the system may comprise a server computer comprising the traversal means and a data storage facility comprising the data store which is operably connected to the server computer. In this arrangement, the user may be associated with a user terminal which is located remotely from the server computer and data store, the user terminal being able to connect to the server computer via a communications network such as the Internet.

In a second arrangement, similar to the first arrangement described above, the traversal means may be located within the data storage facility. Such an arrangement would allow the traversal means to determine more quickly whether a question has been previously answered by the user.

Alternatively, the data store may be located locally to the user. For example, the user may be associated with a user terminal which comprises the traversal means and the data store. In this arrangement a remote storage facility can conveniently store details of the user's workflows and all associated data which can be downloaded to the user terminal as required. Such an arrangement would allow the traversal of a workflow to take place using the user's resources (thereby reducing the demands on the remote storage facility). Once a workflow has been traversed the remote storage facility may be updated by transmitting the answer and conclusion data from the traversal back to the remote storage facility. Conveniently, the remote storage facility may store full details of the workflows and data relating to the user. The user terminal may download either all of the information held on the remote storage facility or alternatively portions thereof.

Preferably, the system further comprises a personal history record which is used to store information relating to the user. The personal history record may also store answer data generated by the user in response to the workflow. Conveniently, answer data given by the user is linked to the question presented to the user to create a question and answer pair which is stored in the personal history record.

It is noted that the system also allows the pairing of any question with any answer of an answer type specified by the question type. This greatly reduces the size of the library of stored information that is required and also the time it takes to build such a library.

According to another aspect of the invention there is provided an apparatus for constructing an interactive workflow document comprising questions, answers and conclusions, the apparatus comprising: specifying means for specifying question, answer and conclusion data as reusable respective question, answer and conclusion assets of the workflow; a data store for storing the reusable question, answer and conclusion assets; selecting means enabling user (user in this sense being the user of the apparatus to build the workflow) selection of a graphical representation of the type of asset required as a node of a graphical workflow, the type determining how the asset is handled; associating means for associating an actual asset of the specified type with each graphical node representation; layout means arranged to enable the user to graphically position each of the selected assets on a layout page; and connecting means arranged to enable user construction of the logical connections between the selected nodes on the layout page, the connected together nodes providing a graphical representation of the interactive workflow document.

This apparatus enables a user to build their own interactive workflow document which may be used, for example, to implement an expert system. Due to the ease with which an interactive workflow document may be created using this apparatus, the user requires no knowledge of computer programming. For example, in the case of a healthcare expert system, the user may be a nurse or a doctor who has expert medical knowledge but little or no knowledge of computer programming.

The apparatus preferably further comprises classifying means arranged to classify each question, answer and conclusion asset and to provide assistance in user selection of a particular asset from consideration of the asset's classification. The classifying means enable assets to be presented to the user in an organised manner, thereby enhancing the ease of the use of the apparatus.

The stored assets within the data store may comprise a library of assets, each asset being classified for ease of retrieval.

The apparatus may further comprise assignment means for assigning a unique identifier to each question, answer and conclusion asset.

Preferably the assigning means is arranged to assign a unique identifier to each graphical node representation and each logical connecting between nodes.

The apparatus may further comprise converting means for converting the graphical representation of the workflow into a table of identifiers specifying the workflow completely. Conveniently, the apparatus further comprises assignment means for assigning unique identifying numbers to each node and asset within the workflow. The converting means can then be arranged to compile a table in which each node within the workflow is characterised by its type, identifier, the identifier of its associated asset and by the connections from that node to other nodes within the workflow.

Optimising means for optimising the table of identifiers into a minimum format representing the connectivity between each pair of connected nodes may also be provided. This feature of the apparatus enables interactive workflow documents to be represented in an efficient manner which leads to their faster traversal, and thus enhanced user satisfaction. Conveniently, the optimising means can order the information derived by the converting means into node pairs. The optimising means may then convert the table derived by the converting means into an optimised table in which each node pair is characterised by the identifier of the first node in the pair, the identifier of an asset associated with one of the nodes in the node pair and the node identifier and node type of the second node in the node pair. This optimisation process results in an compact table representing all the relationships within the workflow. Only the information required to define all the interactions of the workflow is retained.

The selecting means is advantageously arranged to present to the user a plurality of different types of graphical representation of types of asset. The selecting means may also be arranged to present to the user one or more graphical representations of predetermined combinations of question and answer assets (templates and stored loops). This feature also adds to the ease of use of the apparatus for the user, and cuts down the time taken to construct interactive workflow documents.

The specifying means is preferably arranged to retrieve an existing stored question, answer or conclusion asset and to enable the user to edit the same as a new question, answer or conclusion asset. This feature also increases the ease of use of the apparatus, and again decreases the time taken to construct interactive workflow documents.

The specifying means most preferably comprises a graphical user interface. The graphical user interface may have a portion showing the classifications of the stored assets, and may be arranged to enable selection of an asset from consideration of the classifications. These features again increase the facilitates of use of the apparatus by a user.

The graphical user interface may also be arranged to enable user addition, editing and deletion of the assets stored in the data store.

The data store preferably comprises at least one silent question asset which requires no user interaction to determine an associated answer. One consequence of such a feature is that fewer questions need to be asked of a user during the traversal of workflow document, resulting in increased speed and ease of workflow document traversal for the user. This is particularly true if permanent or semi-permanent data is stored in the personal history record that is needed by the traversal, The data store preferably comprises at least one silent conclusion asset which is for internal use within the apparatus and is not presented to the user. This feature permits operations such as calculations to be performed on user data obtained during the traversal of a workflow, resulting in the provision of more complex expert advice. It also enables conclusions to be reached without being presented to the user, again resulting in increase speed and ease of workflow traversal for the user. It also enables confidential or other expert advice to be kept from the user.

The apparatus may further comprise creating means for creating a derived question asset from a value entry question asset, the creating means being arranged to create a question whose answer is determined by the value entry answer asset corresponding to the value entry question asset.

The apparatus may further comprise means for testing the constructed workflow document to confirm the logic associated with the user-determined connections, thus increasing the ease of use of the apparatus for users with little or no computer programming knowledge, or who have a non-technical or non-mathematical background.

A second testing function includes the ability to trace (highlight) in the workflow document the path of any given traversal of the system. This solves the problem of finding where a problem exists (identified by a traversal) inside of a large complex workflow document.

The data store is preferably arranged to store the question and answer assets in pairs. The data store may also be arranged to store at least some of the reusable question, answer and conclusion assets temporarily, and to delete the reusable question, answer and conclusion assets after a given time period or event occurrence.

According to a further aspect of the invention there is provided a method of constructing an interactive workflow document comprising questions, answers and conclusions, the method comprising: specifying question, answer and conclusion data as reusable respective question, answer and conclusion assets of the workflow; storing the reusable question, answer and conclusion assets; enabling user selection of a graphical representation of the type of asset required as a node of a graphical workflow, the type determining how the asset is handled; associating an actual asset of the specified type with each graphical node representation; enabling the user to graphically position each of the selected assets on a layout page; and enabling user construction of the logical connections between the selected nodes on the layout page, the connected together nodes providing a graphical representation of the interactive workflow document.

According to a yet further aspect of the invention, there is provided a data carrier comprising a computer program arranged to configure a computer to implement any one of the methods described above.

According to a still further aspect of the invention, there is provided a workflow representation comprising a question node being linked to a respective stored pre-determined question and a plurality of answer nodes, each answer node having a direct link to the question node.

Different types of answer formats may be presented to the user in the workflow representation. For example, the answer may be a "yes/no" answer and may be presented to the user via two radio boxes, one representing "yes", the other representing "no". The answer could be a "one from many" answer where the user may select a single answer that applies to them. This could again be implemented by the use of radio boxes, or a drop-down menu, for example. Alternatively, the answer could be a "many from many" answer in which the user may select as many answers as apply. Other types of pre-determined answers may include numerical answers, selection of one or more options within an answer table or selection of an image (or a part thereof).

According to even further aspect of the invention, there is provided a representation for a workflow, the workflow comprising a series of interconnected question nodes, answer nodes and conclusion nodes, each of the question, answer and conclusion nodes being associated with a respective question, answer and conclusion asset, the representation comprising a table of identifiers representing the connectivity between pairs of connected nodes.

According to an eighth aspect, the present invention provides a method of traversing a workflow, the workflow comprising a plurality of interconnected question and answer nodes, each question node being linked to a respective stored pre-determined question and each answer node being linked to a respective stored answer, the method comprising:

creating a personal history record for the user at the data store prior to commencing the traversal of the workflow that is pertinent to the upcoming traversal, the personal history record storing personal permanent or semi-permanent information regarding the user determining the type of the current node of the workflow and, if the current node is a question node, accessing a data store, ascertaining whether the data store contains a previously determined answer to the question linked to the current question node and,
  a) if the data store does contain such a previously determined answer, retrieving the answer from the data store and using the retrieved answer to determine the next node of the workflow to be traversed; and
  b) if the data store does not contain such a previously determined answer, presenting the question linked to the current question node to a user, and using answer data obtained from the user to determine the next node of the workflow to be traversed.
wherein (i) the workflow further comprises at least one conclusion node connected to a respective at least one previous node, each conclusion node being associated with a respective stored conclusion specifying information according to the pathway taken through the nodes during the traversal of the workflow and if the current node is a conclusion node, the method further comprises storing the conclusion associated with the conclusion node in the personal history record and (ii) a question comprises a conclusion check question for checking whether a conclusion node has been reached, and the method further comprises referring to the personal history record to ascertain whether it contains a pre-stored conclusion in order to determine the next node of the workflow to be traversed.

According to a ninth aspect, the present invention provides a method of traversing a workflow, the workflow comprising a plurality of interconnected question and answer nodes, each question node being linked to a respective stored pre-determined question and each answer node being linked to a respective stored answer, the workflow comprising a document containing a visual representation of the nodes and their interconnections, the method comprising:
  determining the type of the current node of the workflow and, if the current node is a question node, accessing a data store, ascertaining whether the data store contains a previously determined answer to the question linked to the current question node and,
    a) if the data store does contain such a previously determined answer, retrieving the answer from the data store and using the retrieved answer to determine the next node of the workflow to be traversed; and
    b) if the data store does not contain such a previously determined answer, presenting the question linked to the current question node to a user, and using answer data obtained from the user to determine the next node of the workflow to be traversed

BRIEF DESCRIPTION OF DRAWINGS

The invention will be described, by way example only, with reference to the accompanying drawings, in which:

FIGS. 2b and 2c are diagrams of alternative client-server system arrangements suitable for implementing preferred embodiments of the present invention;

Figure 4G:
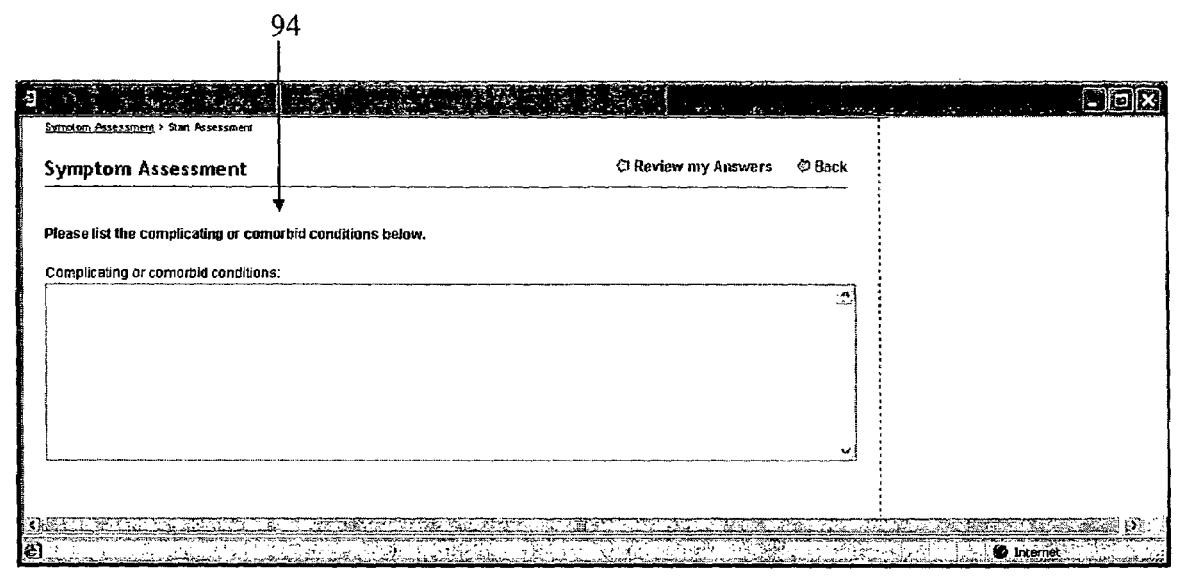

FIGS. 4a to 4g are screenshots of part of the expert tool which illustrate types of question assets;

FIGS. 8c and 8d are database tables representing the workflow documents shown in FIGS. 8a and 8b, respectively, for use in preferred embodiments of the present invention;

FIG. 17a is a screenshot of an emergency indicator page of the expert system produced by the expert tool of FIG. 3;

FIG. 17b is a screenshot of a pop-up menu giving more details of one of the emergency indicators shown in the screenshot of FIG. 17a;

FIG. 18 is a screenshot of a summary page of the expert system produced by the expert tool of FIG. 3; and FIG. 19 is a screenshot of a conclusion page of the expert system produced by the expert tool of FIG. 3.

DETAILED DESCRIPTION OF THE PREFERRED EMBODIMENTS

Figure 1:
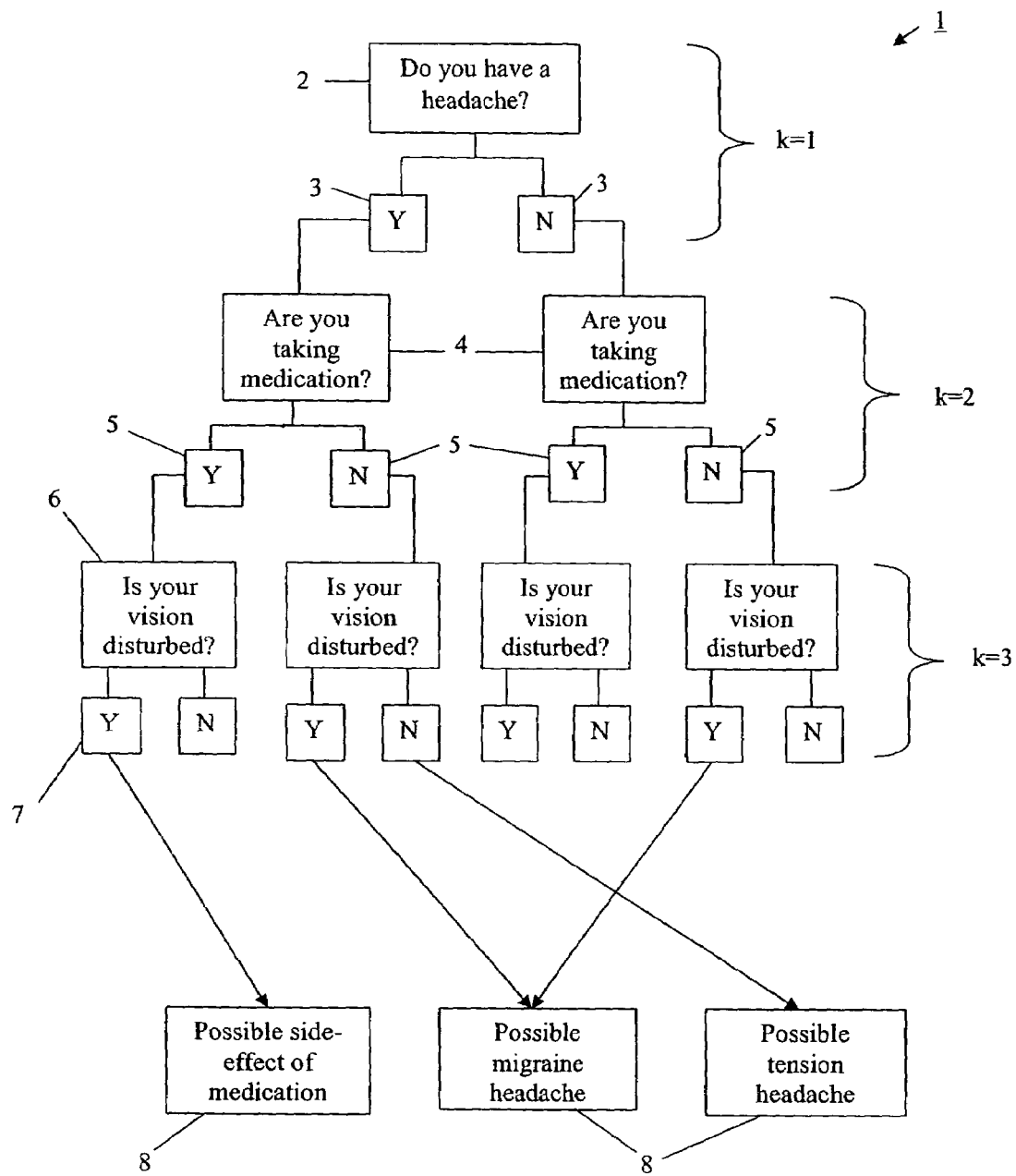
FIG. 1 is a tree diagram which may be implemented by a prior art expert system.

Referring to FIG. 2, there is shown a client-server computer system 11 which is suitable for implementing preferred embodiments of the present invention, the computer system 11 comprising a client side 10a and a server side lob.

The client side 10a of the computer system 11 comprises a remote client computer 12a which is provided with an Internet or Web browser 24 for displaying Web pages (not shown). The client side 10a of the computer system 11 may in an alternative embodiment comprise many remote client computers 12a.

The server side 10b of the computer system 11 includes a server computer 14 which has a Web server capability, and a local client computer 12b which is also provided with a Web browser 24.

The remote client computer 12a is in use connected to the server computer 14 via the Internet 16. The local client computer 12b is in use connected to the server computer 14 via a local area network connection 18. However, other wide area and local area network connections are also possible between these computers 12a, 14, 12b.

The server computer 14 is arranged to run an application 20 which is referred to hereinafter as an "expert tool". The server computer 14 is also arranged to host a data storage facility comprising a data store 22 which provides a central resource for storing data relating to the expert tool 20. The data store 22 includes a database management system (not shown) for managing incoming data, and for filing and retrieving data.

The expert tool 20 enables a user 26 to build their own expert system 28 which resides on the server computer 14. More particularly, the expert tool 20 enables the user 26 to create workflow documents 36 which comprise a series of interconnected question, answer and conclusion nodes. Each of the question, answer and conclusion nodes is associated with a respective question, answer and conclusion. Questions, answers and conclusions are collectively known as "assets" 54, and are stored in the data store 22. A patient history record 134 comprising a plurality of question and answer pairs 136 (as well as other information) may also be stored in the data store 22.

The workflow documents 36 form part of the expert system 28, and are also stored at the data store 22. Both the expert tool 20 and expert system 28 include a traversal engine 29 for traversing a workflow document 36. The traversal engine 29 is also arranged to retrieve data from the data store 22. As the nodes of the workflow document 36 are traversed, questions are displayed to an end-user 52 in his or her Web browser 24. The answers given by the end-user 52 to these questions determine the logic pathway taken through a workflow document 36 during the traversal thereof, and thus also determine the conclusions which provide expert information, and which are presented to the end-user 52 in his or her Web browser 24.

Figure 2A:
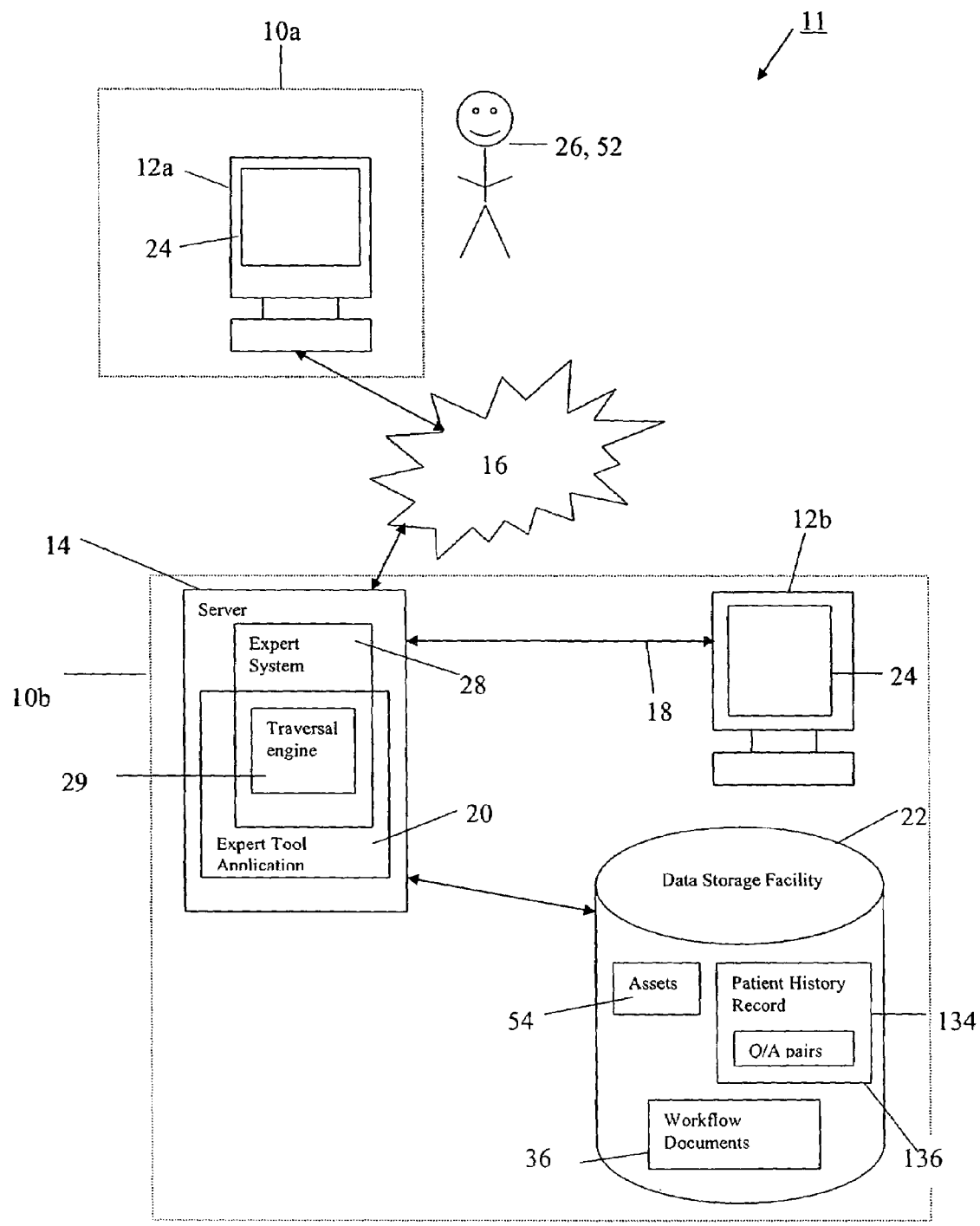
FIG. 2a is a diagram of a client-server system suitable for implementing preferred embodiments of the present invention.

FIG. 2b shows an alternative client-server system arrangement to that shown in FIG. 2a. It is noted however that like numerals have been used to denote like features.

In FIG. 2b the traversal means 29 and expert system 28 are not located within the server computer 14. In this alternative arrangement a remote data storage facility 19 comprises the data store 22 (as described above in relation to FIG. 2a) and the traversal means 29 and expert system 28.

The server computer 14, which now acts as an interface between the remote storage facility 19 and the user's computer 12a, comprises the expert tool 20 (as described in relation to FIG. 2a) and additionally question transmission means 15 and answer storage means 17. The question transmission means 15 is arranged to relay questions encountered by the traversal means when traversing the workflow to the user. The answer storage means 17 is arranged to receive the user's answers to the questions presented by the transmission means 15. Additionally, the answer storage means 17 transmits the user's answers back to the data store 22 for incorporation within the patient history record 134.

The traversal engine 29 of FIG. 2b may conveniently run almost exclusively in TQSL (Transact-SQL, an enhanced version of the SQL relational database language).

The arrangement of FIG. 2b is a more efficient arrangement than FIG. 2a as measured by the number of data store calls. In FIG. 2a, the traversal engine will query the data store at each question node for a previously determined answer. The database will then answer each request that the traversal engine makes.

In FIG. 2b the traversal engine and data store are both incorporated within the data storage facility. The user interface (the server computer 14) only therefore needs to call the data storage facility for the next question to be answered from the workflow. The traversal engine may in this arrangement work through the workflow with previously determined data in the data store before communicating with the server computer. In this way, database calls are reduced.

The traversal arrangement shown in FIG. 2b permits the preloading of the data store with answers thereby effectively allowing the algorithm to be run against may sets of data.

It is noted that the total number of users that can run workflow traversals in the arrangement of FIG. 2b is related to the speed of the database server.

FIG. 2c shows a further alternative client-server system arrangement to that shown in either FIG. 2a or FIG. 2b. Once again it is noted that like numerals have been used to denote like features.

In FIG. 2c, the data store that is accessed by the traversal means is located locally to the user.

As in FIG. 2a, the server side 10b of the computer system 11 of the arrangement shown in FIG. 2c includes a server computer 14 which in use is connected to the remote client computer 12a via the Internet 16. As in FIG. 2a, the server computer 14 is arranged to run the "expert tool" application 20 and is arranged to host a data storage facility comprising a data store 22' which provides a central resource for storing data relating to the expert tool 20.

In contrast to FIG. 2a, however, the traversal engine 29 and expert system 28 are hosted by the remote client computer 12a. The remote client computer further comprises a copy of the data store 22 which the traversal engine accesses when traversing a workflow. The data within the data store on the remote client computer is downloaded from the server side 10b of the computer system either prior to the traversal of a workflow or as required (Note: the data store on the server side of the computer system 11 has been referred to as 22' in order to contrast it with the local data store 22 on the client computer 12a. It is to be noted however that the data store 22' is essentially the same as the data stores 22 of the arrangements of FIGS. 2a and 2b).

When the client wishes to traverse a workflow, the traversal engine 29 in the arrangement of FIG. 2c connects via the network connection and server computer 14 to the data store 22' in order to download a workflow document (or part thereof). The workflow document is first compiled into C++ source code by the traversal engine and then into native code (for example by using a suitable Microsoft® product).

The traversal engine 29 then connects to the data store 22' (via the internet and server computer) and downloads all pre-existing information relating to the client.

The workflow (or part thereof) is then run on the client terminal 12a. The answers and conclusions generated by the traversal of the workflow are, once the traversal is complete, sent back to the data store 22'.

The arrangement of FIG. 2c reduces the requests to the data store on the server side of the computer system as compared to either the arrangement of FIG. 2a or the arrangement of FIG. 2b. Connections to the data store 22' are made only when the client computer 12c needs to download a new workflow or when the data store 22' is being updated with answer and conclusion data.

The arrangement of FIG. 2c allows algorithms (parts of a workflow document) to be deployed in smaller packages for specific problems. A small collection of algorithms could be developed for a specific task and deployed as a stand alone application with either no need for connection to the data store 22' or the ability to work disconnected from the data store 22' and update at a later time.

The following description relates to the arrangement of FIG. 2a although the skilled person will appreciate that it applies equally to the arrangements of FIGS. 2b and 2c.

Figure 3:
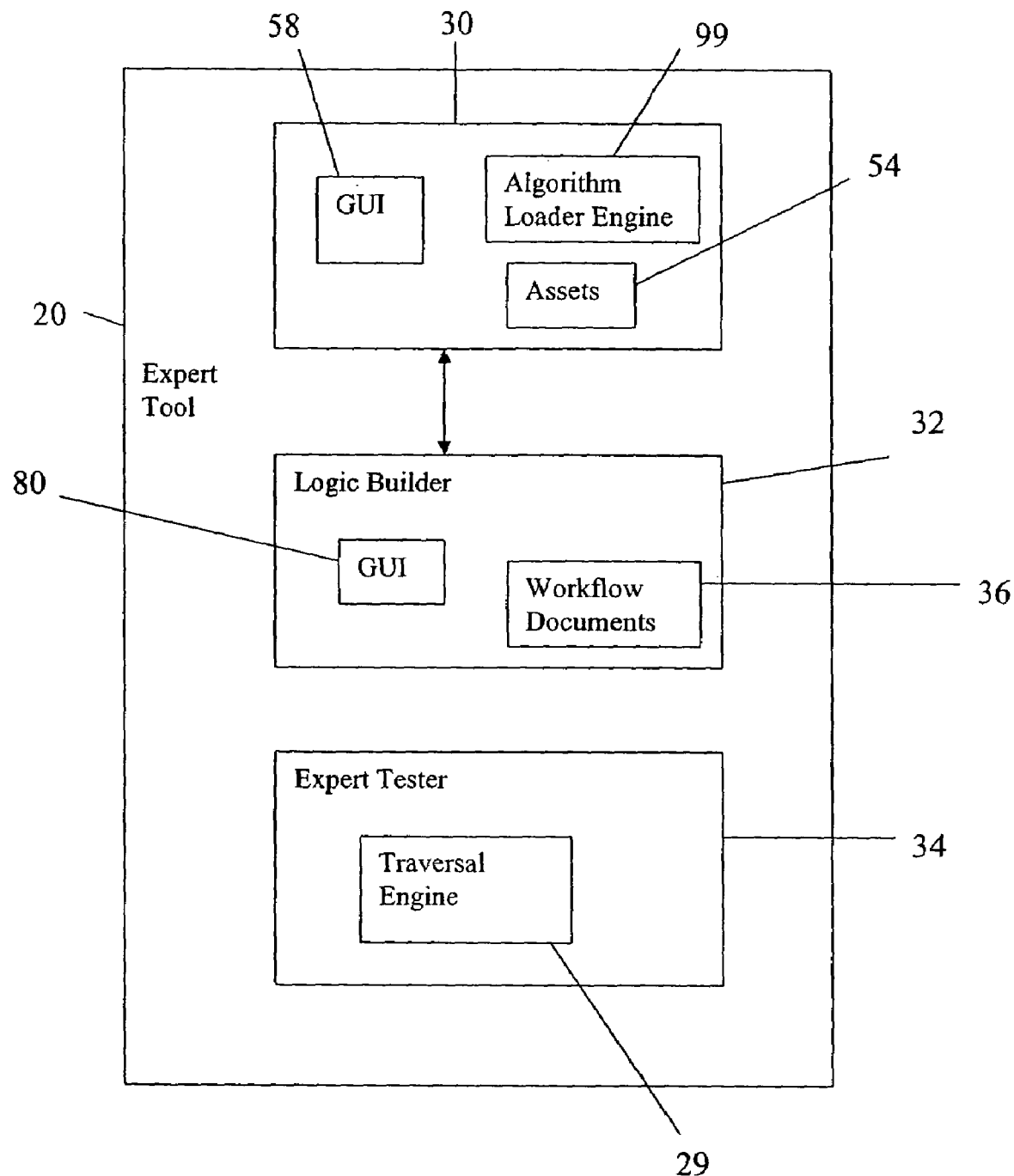
FIG. 3 is a schematic representation of the modules of an expert tool for building an expert system which utilises preferred embodiments of the present invention.

Referring now to FIG. 3 of the drawings, the modules of the expert tool 20 are shown. The expert tool 20 comprises three main modules: 1) an Asset Builder 30; 2) a Logic Builder 32; and 3) an Expert Tester 34. The functions that these three main modules 30, 32 and 34 implement are now described.

The Asset Builder 30 allows the user 26 to create question, answer and conclusion assets 54, and to build a library of such assets 54. Upon creation, each asset 54 is assigned a unique numerical identifier to enable it to be tracked within the expert tool 20 and system 28. Each asset 54 and its respective unique numerical identifier are then stored in the data store 22.

The expert tool 20 may be used by a healthcare practitioner user 26 to build a health assessment expert system 28, and the end-user 52 of the expert system may be a lay-person with little or no medical knowledge. The health assessment requires end-users 52 to be asked a series of questions about themselves and their lifestyles, and the answers given to these questions determine the flow of logic in the expert system 28, and therefore the conclusions (i.e. expert information) presented to them at the end of the health assessment. For example, a health assessment may require details of whether or not the end-user 52 is overweight. The healthcare practitioner user 26 may therefore create a question asset 54 in the Asset Builder 30 asking the end-user 52: "What is your height and weight?", the answer to which can be used to calculate the end-user's body mass index (BMI). Another question asset 54 "BMI over 30?" may be created by the user 26 in the Asset Builder 30, together with the conclusion asset 54 "You need to lose weight". Thus, if the end-user's BMI is calculated and it is over the value of 30, the conclusion asset 54 "You need to lose weight" will be presented to the end-user 52 at the end of the health assessment.

As well as question, answer and conclusion assets 54, care point assets can also be created in the Asset Builder 30, and these care point assets may be associated with particular conclusion assets. For example, in the previous health assessment case, the care point "Eat more fruit and vegetables and less processed and convenience food" may be created by the user 26 in the Asset Builder 30. This care point asset 54 can be associated with the conclusion asset 54 "You need to lose weight" so that it can be displayed to the end-user 52 at the end of the health assessment.

Another type of asset 54 which may be created in the Asset Builder 30 is a start asset 54. Each workflow document 36 possesses a single such asset 54 which is associated with the initial node of the workflow document 36. This will be explained in more detail later.

The Asset Builder 30 also provides for the creation of transfer assets 54. Such assets 54 cause automatic transfer from a first workflow document 36a to a second workflow document 36b during a traversal of the first workflow document 36a. Stop assets 54 may also be created in the Asset Builder 30. When a stop asset 54 is encountered during the traversal of a workflow document 36 this indicates that the traversal should be terminated.

Message assets 54 may also be created in the Asset Builder 30 for sending messages during the traversal of a workflow.

The Asset Builder 30 also permits the creation of different categories of assets 54 to form the asset library. For example, the assets 54 of the previous example could be categorised as health assets, or even BMI assets. This facilitates housekeeping of the assets 54, so that they may be found more easily by the user 26 in the expert tool 20, and can be re-used in different workflow documents 36, or even in different parts of the same workflow document 36.

The Asset Builder 30 also provides a search function to enable searching for assets 54. Furthermore, the Asset Builder 30 provides for the automatic updating of individual assets 54. Thus, if an asset 54 is used in more than one workflow document 36, the editing of one instance of the asset 54 will cause all instances of the same asset 54 to be automatically updated.

Some of the different types of assets 54 will now be described in more detail. Firstly, question assets will be discussed.

Figure 4A:
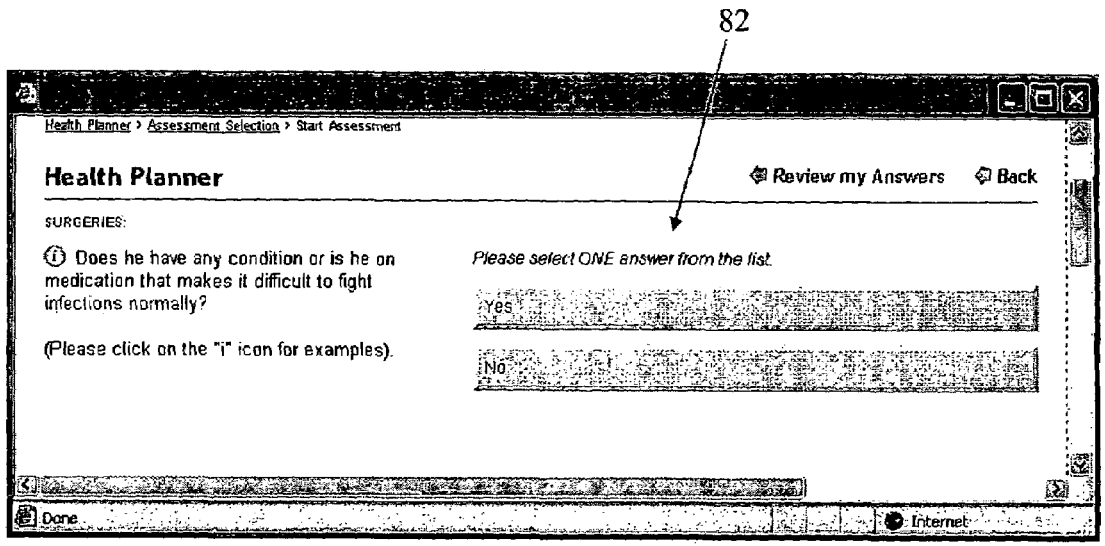
Figure 4B:
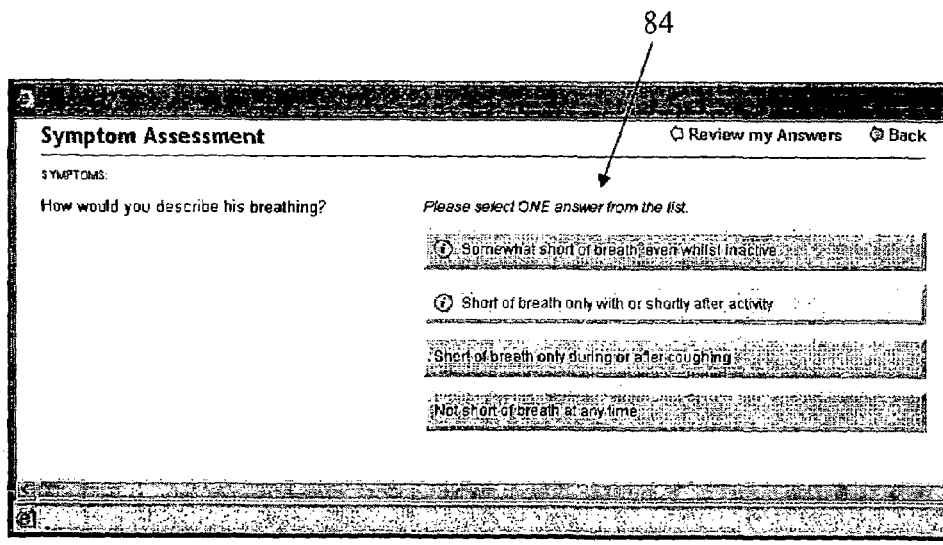
Figure 4D:
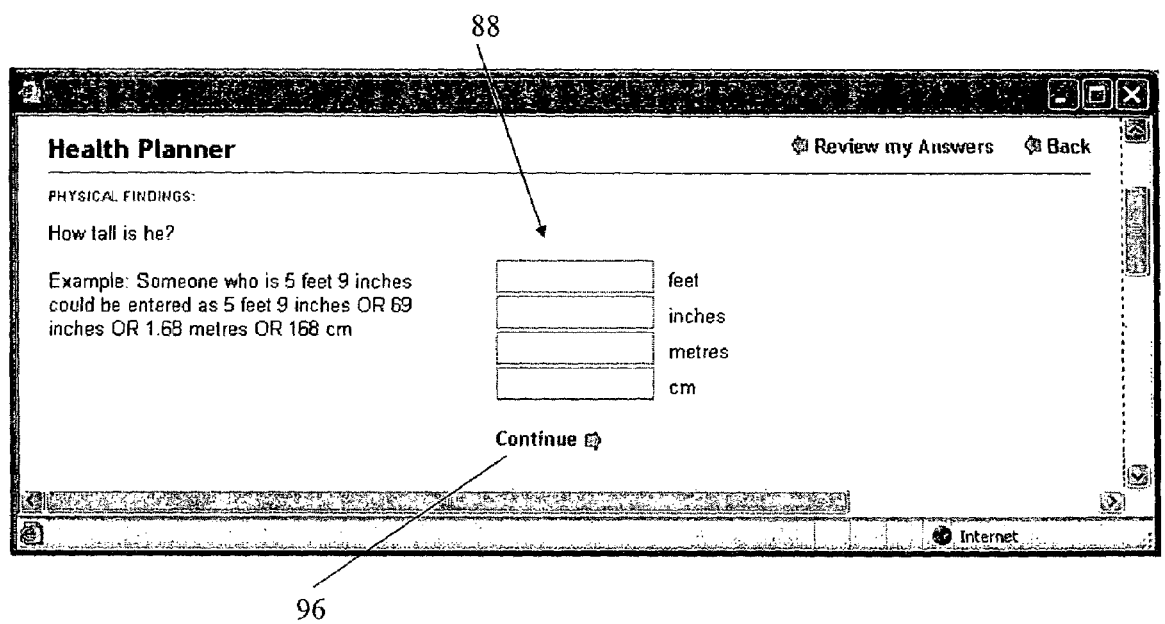
Figure 13:
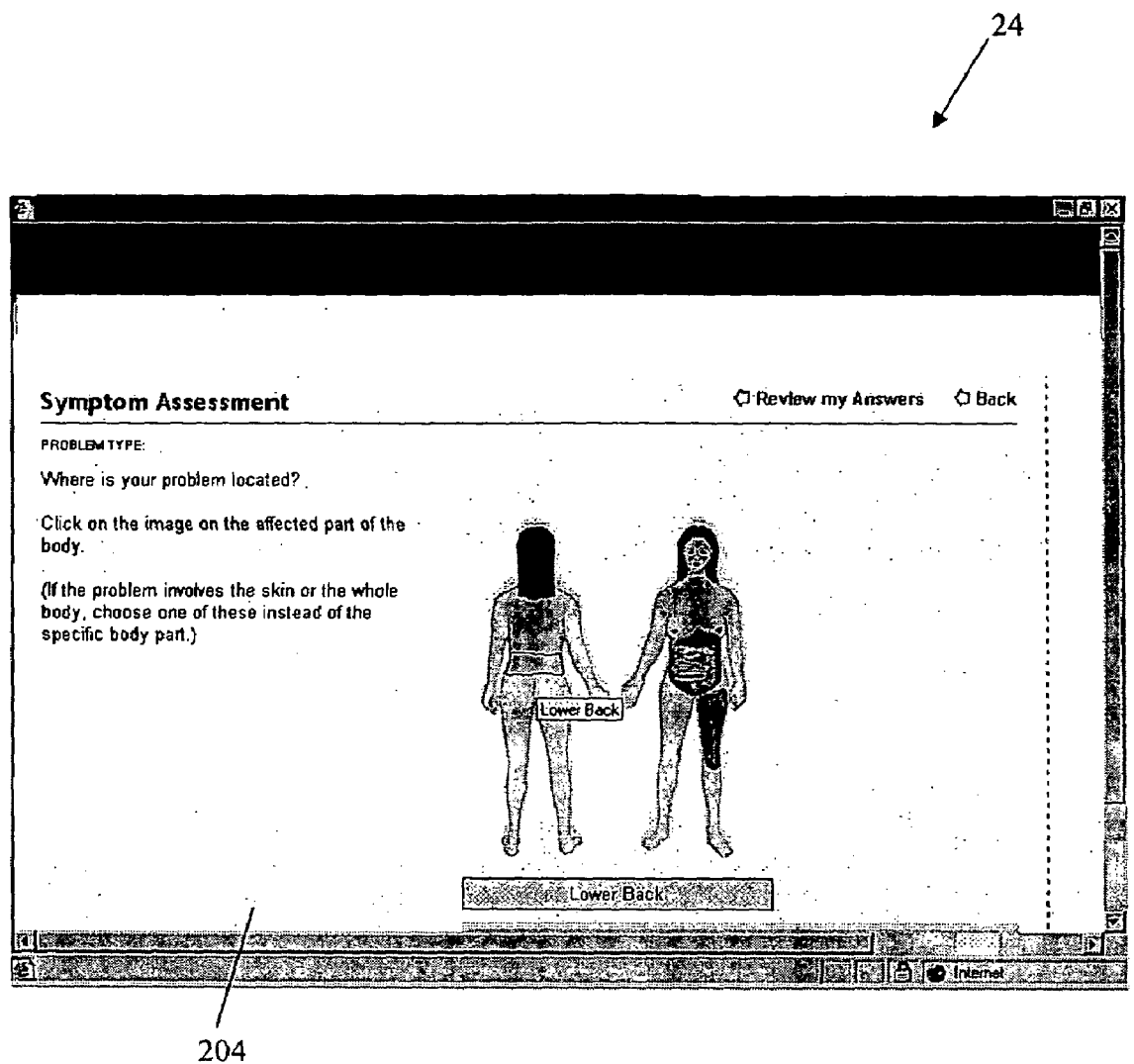

Different types of question assets 54 may be specified in the Asset Builder 30. The question type specifies how the traversal engine 29 handles and formats questions for presentation to the end-user 52. The following question types may be specified in the Asset Builder 30 (note that this list is not exhaustive):

"Normal" (i.e. Yes/No 82 or single answer multiple choice question 84), as shown in FIGS. 4a and 4b, respectively;

">1 Answer" 86 (i.e. more than one answer possible in response to the question), as shown in FIG. 4c;

"Value Entry" 88 (i.e. the end-user is asked to enter a number), as shown in FIG. 4d;

"Exclusive Table" 90 (i.e. there is only one answer possible per table row), as shown in FIG. 4e;

"Non-Exclusive Table" 92 (i.e. there is more than one answer possible per table row), as shown in FIG. 4f;

"Calculated" (i.e. calculate an answer using known numerical information);

"Free Text" 94 (i.e. allows the end-user 52 to enter their answer in a free text field), as shown in FIG. 4g; and Image Questions (i.e. allows the answer to a one answer multiple choice question to be a hot spot on an image, e.g. "Where is the pain located?", with the answer being a hot spot on a body image displayed to the end-user 52, as shown in FIG. 13).

Check questions can also be provided, such as age check, gender check, conclusion check and language check questions. Such questions are used to retrieve stored answers from the data store (22).

It is noted that traditional logic tree structures cannot deal with multiple exits from a question-answer group. In other words, faced with including a question having any combination of ten possible answers into a prior art workflow, the question would have to be asked ten times. The present invention, however, allows a list of 10 possible answers to be presented to a user and therefore overcomes the problem of storing 1024 different ways of answering the question by storing only the selected or not selected state of each question-answer pair (i.e. 10 data points only).

The use of Exclusive and Non-exclusive tables also reduces the information that the workflow needs to handle and store as compared to prior art techniques. For example, the present invention allows the answers to a question referring to a 5×5 table (where only one answer per row is possible) to be stored as 5 pieces of information instead of accounting for 3,125 different ways of answering the question in the algorithm. For a 5×5 table where multiple answers per row are possible the present invention allows the answers to be stored as 25 pieces of information instead of accounting for 33,554,432 different ways of answering the question in the algorithm.

Value Entry questions 88 require the end-user 52 to enter a value answer, as illustrated in FIG. 4d where an end-user 52 is asked to enter a person's height. Value Entry questions 88 can include a calculation function for manipulating a value answer. For example, the question "How much do you weigh?" could be answered in stones, pounds, or kilograms, in which case a calculation to convert the answer to a chosen unit (such as kilograms) can be included in the question.

Calculated questions are used to calculate an answer using numerical information that has been obtained from a value entry question and subsequently stored in the data store 22. The calculated question type is "silent". That is, it is used to question the data store 22 rather than the end-user 52. Returning to the BMI example, BMI is a function of a person's height and weight. Referring to FIG. 4d, the Value Entry question 88 is used to obtain the end-user's height and weight, and these numerical values are stored in the data store 22 when the end-user presses a continue button 96 associated with the value entry question 88. To calculate the end-user's BMI, a calculated question is provided to retrieve the end-user's height and weight from the data store 22, and to calculate his BMI. This BMI value is also written to the data store 22, and can itself be retrieved therefrom using a silent question.

In the Asset Builder 30, calculated questions are automatically created by "deriving" a question from the appropriate value entry question 88. Thus, if the user 26 has created a value entry question 88 to obtain the end-user's height and weight, the user 26 may click a "derive question" button (not shown) in the Asset Builder 30 associated with the BMI value entry question, and then fill out the details of the value entry question in editable text boxes provided (also not shown).

Now, answer assets 54 will be described in more detail.

The following type of answer assets may be specified in the Asset Builder 30: text, numeric (or value) entries, ranges, and calculations. Most answers have to be created by the user 26, others are system defined (such as Yes, No, Male or Female).

A derived answer type is also provided, which may be used to reference questions and conclusions. For example, for a conclusion asset to be used as a piece of logic in a workflow document 36, an answer must be derived from the conclusion asset. The derived answer can then be used to ask silently whether particular conclusions have been reached before in the current assessment. For example, a conclusion may have been reached that the end-user 52 has possible motion sickness. A derived answer will then comprise the answer "Conclusion of possible motion sickness reached". In other words, a silent question may question the data store 22 and ask which conclusions have been reached, the derived answers are then compared with the answers retrieved from the data store 22 that are associated with the silent question, and the retrieved answers are used to determine the logic pathway during the traversal of the workflow document 36.

Moving on now to conclusion assets 54, these assets may also be specified as silent. Silent conclusions are never seen by the end-user 52, but are themselves used as pieces of logic in a workflow document 36. For example, if the expert system 28 were to implement an insurance underwriting assessment, one conclusion which may be reached is that a person is high risk for a back pain claim. If specified as a silent conclusion, this conclusion would not be presented to the end-user 52, but would be used in determining whether to underwrite insurance, and at what price.

Question and answer assets 54 may also have a history type which determines whether, and for how long, the asset 54 is stored in the data store 22. Upon starting an assessment, an end-user history file 134 is created for the end-user 52. This file 134 stores information such as the end-user's personal details (name, address, age etc) and is stored in the data store 22. The history file 134 may also contain the results of previous assessments. As the workflow document 36 is traversed, the questions and their associated answers 136 are also stored in the end-user's history file 134. The history type of a question and answer pair 136 may be specified as "transient", in which case the question and its associated answers is only stored in the history file 134 (and therefore the data store 22) for the current assessment, and are then automatically subsequently deleted. Alternatively, the history type may be specified as "permanent", in which case the question and its associated answer is stored permanently in the history file 134, but can be deleted or amended by the end-user 52.

The permanent history type may be further specified as "permanent positive", which means that if the answer to a question (e.g. "have you had your tonsils removed?") is "yes", it is stored permanently in the end-user's history file 134, but it is not stored if the answer to the question is "no". The transient history type may further be specified as "no summary", which means that answers of this type do not appear on a summary data page presented to the user (the summary data page will be described later). The transient history type may further be specified as "no pre-answer", which means that this question will be presented to the end-user 52 each time it appears in the traversal of a workflow document 36, rather than the traversal engine checking whether it has been pre-answered and is stored in the data store 22. The pre-answering functionality will be explained later.

Figure 5:
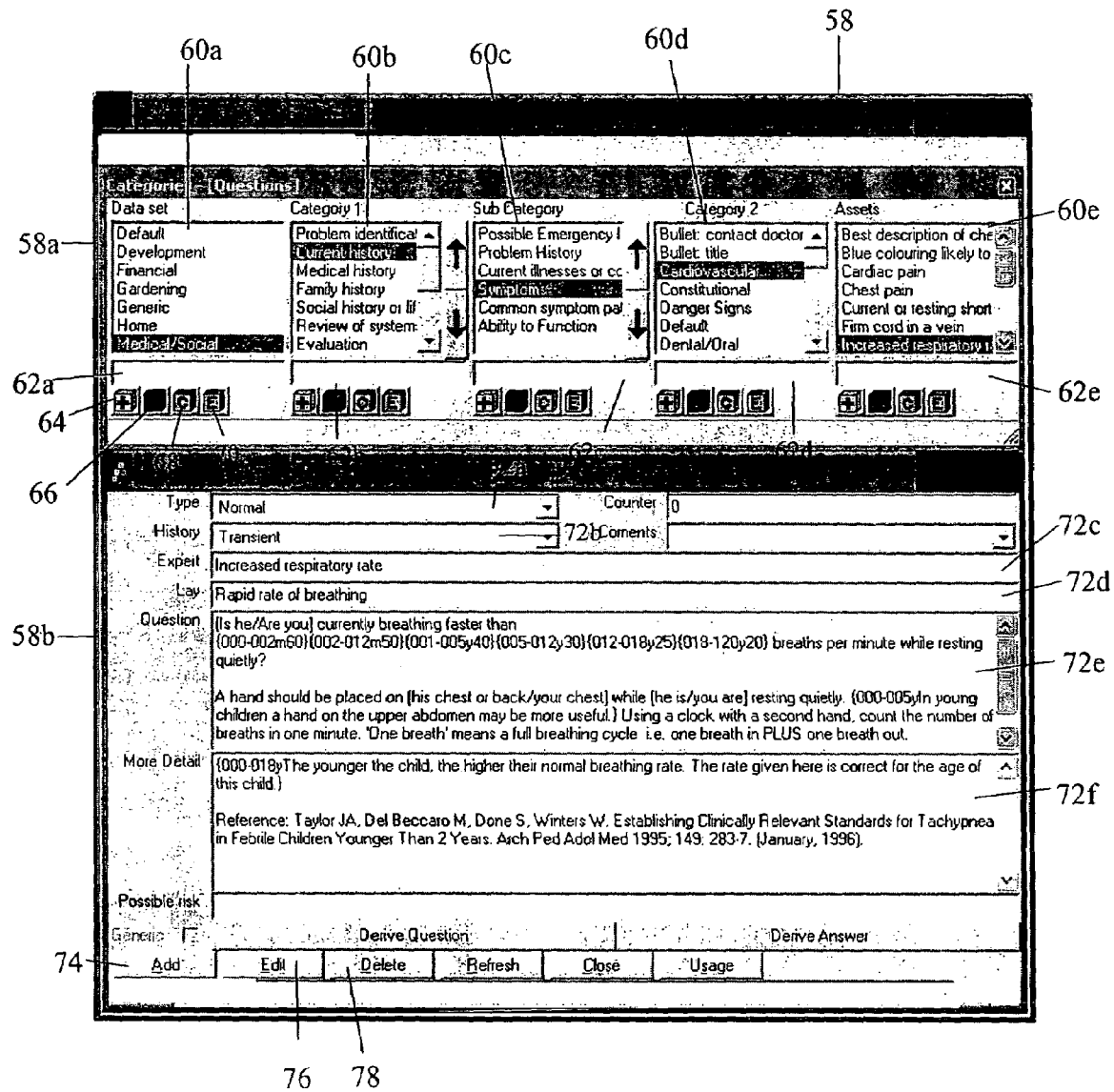
FIG. 5 is a screenshot of the GUI of the Asset Builder module of the expert tool.

The Asset Builder 30 includes a graphical user interface (GUI) 58, as shown in FIG. 5. The GUI 58 comprises an upper portion 58a and a lower portion 58b. The upper portion 58a of the GUI comprises a plurality of scrollable lists 60a to 60e, and associated editable text boxes 62a to 62e.

Starting from the left hand side of the upper portion 58a of the GUI 58, the first list 60a comprises the data set (i.e. the library) with which an asset 54 is associated. For example, an asset 54 may be associated with a medical/social library, a financial library, a gardening library, etc. The user 26 is able to create data sets by entering the name of the data set in the associated editable text box 62a and clicking a "plus" button 64 provided beneath the text box 62a.

The second list 60b comprises the category with which an asset 54 may be associated. Categories such as current history, medical history and family history may be used for the medical/social data set. Again, categories can be added by the user 26 by typing a category name in the associated text box 62b and clicking the plus button 64 provided beneath the text box 62b. The third list 60c comprises a sub-category. Examples of the possible sub-categories for the current history category are possible emergency, current illnesses or condition, symptoms, ability to function etc. The fourth list 60d comprises a category 2 for the current data set. Examples of the possible categories 2 are cardiovascular, constitutional and dental/oral etc. Again, sub-categories or categories may be added by typing text into the appropriate text boxes 62c and 62d and clicking the respective plus buttons 64 provided beneath those text boxes 62c and 62d. Categories and subcategories may be used to organise information presented to the end-user 52 in the client data pages (Web pages, in this example). They may also be used to determine how the assets 54 are arranged in the data store 22.

Finally, the last list 60e comprises the assets 54 associated with a particular dataset, category, or subcategory. For the cardiovascular sub-category 2, assets such as cardiac pain and increased respiratory rate etc may be specified. Assets 54 may be added to the data store 22 by typing the asset name in the associated text box 62e and clicking the provided "plus" button 64.

Data sets, categories, sub-categories and assets may also be deleted, cleared and edited by clicking on the appropriate "minus", "clear" and "edit" buttons 66, 68 and 70 provided beneath the editable text boxes.

Looking now at the lower portion 58b of the GUI 58, there is provided a plurality of editable text boxes 72a to 72f for entering text relating to an asset 54. In this case, a question asset 54 is shown, and there is provided a "question type" text box 72a for specifying the question type. A "question history"

text box 72b is also provided for specifying the history type (e.g. transient, permanent etc) of the question asset 54. "Expert statement" and "lay statement" text boxes 72c and 72d are also provided for the question asset 54. The expert statement allows a summary of a question for an expert 26 to be specified, and the lay statement allows a summary of the question for the lay person (i.e. end-user) 52 to be specified. A "question" text box 72e is further provided for adding question text which is displayed to the end-user 52 during the traversal of a workflow document 36 during an assessment. The question itself is able to accommodate different text for different ages and genders, and may present the questions, answers and conclusions to the end-user 52 in the second and third person.

An information (or "more detail") text box 72f is also provided. This text box 72f allows the user 26 to include, for example, encyclopaedia references for information icons (which will be described in further detail later). References (such as images) may also be associated with question assets, and also with answer and conclusion assets, and even entire workflow documents 36.

Once text has been entered into the appropriate text boxes 72a to 72f, the question asset 54 may be saved to the data store 22 by clicking an "add" button 74 provided at the bottom of the GUI 58. Similarly, the text of the question asset may be edited or deleted from the data store 22 by clicking respective "edit" or "delete" buttons 76 and 78 provided at the bottom of the GUI 58.

Once the assets 54 have been created in the Asset Builder 30 and stored in the data store 22, they can be transferred to the Logic Builder 32 for compiling into one or more workflow documents 36 which define the possible logic flow in the expert system 28. The Logic Builder 32 will now be described in detail.

Figure 6:
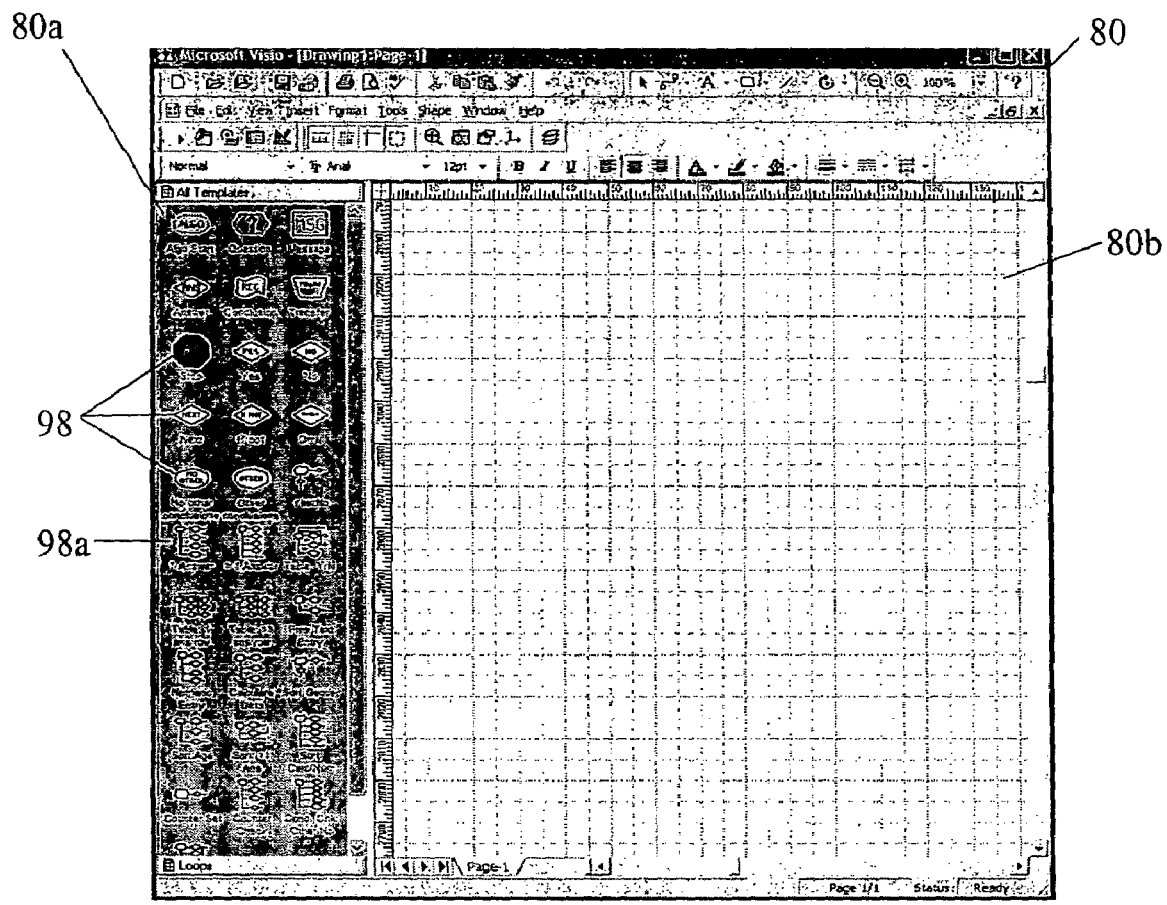
FIG. 6 is a screenshot of the GUI of the Logic Builder module of the expert tool.

Returning to FIG. 3, the Logic Builder 32 comprises a GUI 80 which in this case is provided by a drawing application such as Microsoft™ Visio™. A screenshot of the Logic Builder GUI 80 is shown in FIG. 6. The GUI 80 comprises a left-hand portion 80a including a plurality of templates 98, and a right-hand portion 80b comprising a display area in which the assets 54 are placed to form the nodes of a workflow document 36.

The Logic Builder 32 and Asset Builder 30 are linked so that assets 54 may be transferred directly from the Asset Builder 30 into the Logic Builder 32 using, for example, "drag and drop", to form the workflow nodes. The workflow nodes are then interconnected to define the logic pathways in the workflow document 36. The connections are created by drawing lines from one workflow node to another.

As stated previously, the left-hand portion 80a of the GUI shows a plurality of templates 98. A template 98 may be provided for each workflow node type, such as an answer node, a question node, a start node, a conclusion node, and a transfer node. Templates 98 may also be provided which comprise a plurality of interconnected nodes. For example, a one-answer question template 98a may be provided, comprising a single question node connected to four answer nodes. A template 98 may be dragged from the left-hand portion 80a of the GUI and dropped into the display portion 80b of the GUI. The user 26 then simply has to associate the required assets 54 from the Asset Builder 30 with each of the nodes of the template 98. A workflow document 36 may comprise one or more such templates 98. Templates 98 minimise the risk of the user 26 making mistakes when creating a workflow document 36, and also speeds up the workflow document creation process.

The positioning of the workflow nodes in the workflow document 36 may also determine how the assets 54 are displayed to the end-user 52. For example, considering the one-answer question template 98a where a question node is connected to four answer nodes, the answer associated with the uppermost answer node in the workflow document 36 may be presented to the end-user 52 first, and the answer associated with the lowermost answer node presented to the end-user 52 last. Additionally, nodes may be grouped so that the associated questions and answers can be presented to the end-user 52 on a single client data page. The grouping of the nodes is carried out simply by drawing a box around the nodes which are to appear on the same client data page.

The Logic Builder 32 further implements an event capture function which captures the position of each asset 54 and connection as they are placed in the display area 80b of the GUI 80 to enable an alphanumerical representation of visual workflow document 36 to be created. The Logic Builder 32 also creates a unique numerical identifier for each workflow node which is different from the unique identifier of the associated asset 54. A unique numerical identifier is also created for each connection between the nodes. The purpose of these unique numerical identifiers will be described later.

The Logic Builder 32 also provides for report generation. Different types of reports may be generated. One such report is a conclusion report. This is a text report containing all of the text in the conclusion assets specified by the user 26. A question/answer report may also be generated. This is a text report that contains all of the text in the question and answer assets 54 which are specified by the user 26. The user 26 may specify the assets 54 that they want included in these reports by highlighting the associated nodes in the GUI 80.

Figure 7:
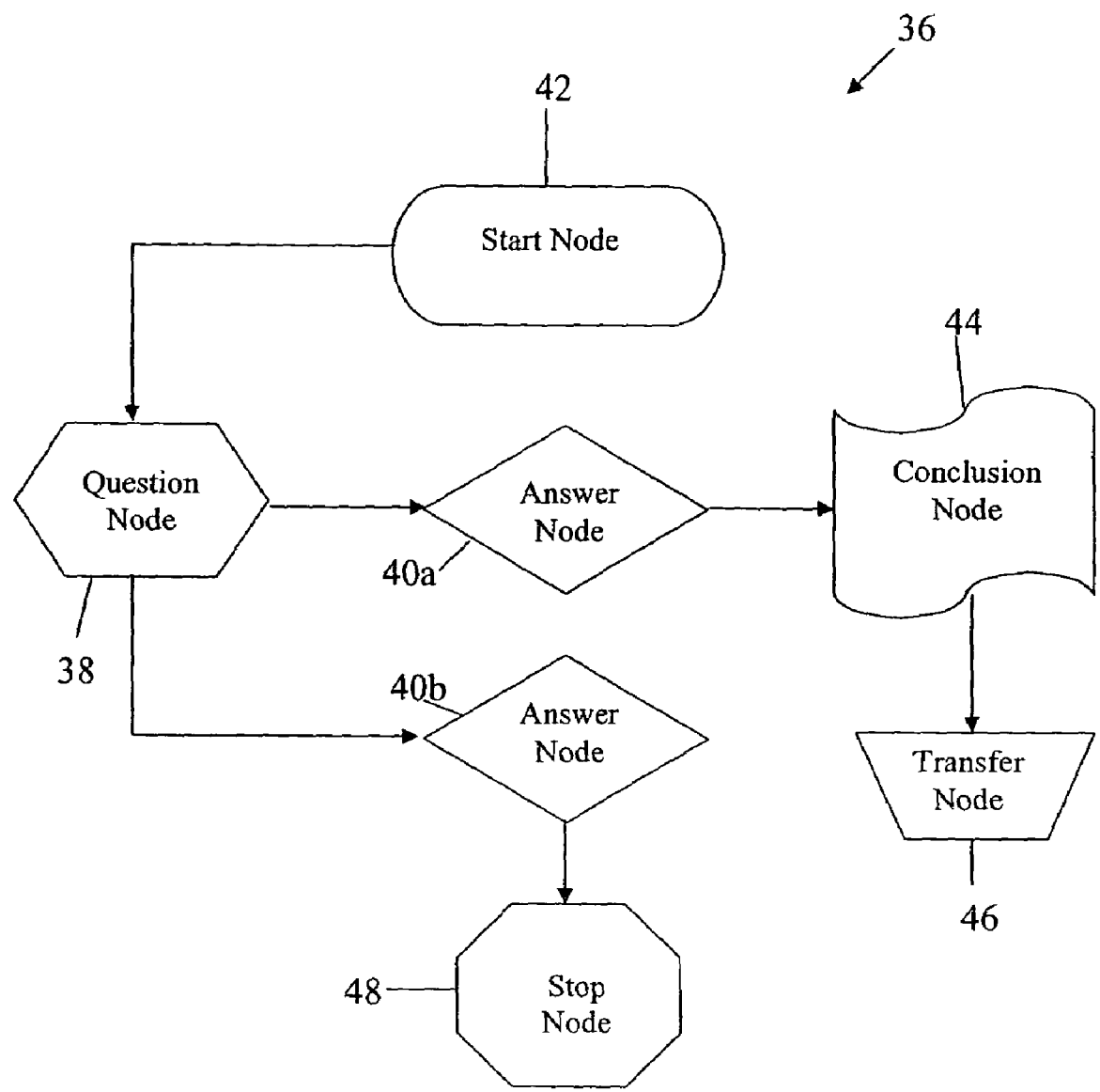
FIG. 7 is a schematic representation of a visual workflow document for use in preferred embodiments of the present invention.

Referring now to FIG. 7, there is shown a simple workflow document 36 comprising a plurality of nodes which can be created using the Logic Builder 32. This simple workflow document 36 includes one question node 38, first and second answer nodes 40a and 40b, a start node 42, a conclusion node 44, a transfer node 46 (for linking one workflow document 36 to another), and a stop node 48 (which terminates the traversal of the workflow document 36). Each node type is represented by a different shape in the workflow document 36.

As stated previously, the pattern of interconnectivity of the workflow nodes determines the flow of logic during the traversal of a workflow document 36. For example, in this particular workflow document 36, the start node 42 is connected to the question node 38, and the question node 38 is connected to the first and second answer nodes 40a and 40b via separate connections. The first answer node 40a is connected to the conclusion node 44, and the conclusion node 44 is connected to the transfer node 46. The second answer node 40b is connected to the stop node 48. This means that the flow of logic in this workflow document 36 has two possible pathways: 1) from the question node 38 to the transfer node 46 via the first answer node 40a and the conclusion node 44, and 2) from the question node 38 to the stop node 48 via the second answer node 40b. The logic path taken during traversal of the workflow document 36 therefore depends on the answer given to the question associated with the question node 38.

As mentioned previously, assets 54 from the data store 22 are associated with respective nodes in the workflow document 36. So, referring to the previous BMI example, the question node 38 could be associated with a silent question asset "What is your BMI?", the first answer node 40a with the answer asset "BMI over 25", and the second answer node 40b with another answer asset "BMI less than or equal to 25". Thus, if the end-user's BMI is over 25, the conclusion asset "You need to lose weight" will be displayed to the end-user 52, and the flow of logic is then transferred to another workflow document which may then, for example, question the end-user 52 on their eating habits. On the other hand, if the end-user's BMI is less than or equal to 25, traversal of the workflow document 36 terminates, and the conclusion reached during the traversal of other, linked workflow documents 36 may be presented to the end-user 52.

A workflow document 36 may also contain one or more message nodes (not shown) which are associated with one or more respective message assets. If a message node is encountered during traversal of a workflow document 36, the message asset will be sent to the end-user 52 prior to completion of the traversal.

Once the visual workflow document 36 has been created using the drawing application, it is converted into a data table 81. This conversion step is now explained with reference to FIGS. 8a, 8b, 8c and 8d.

Figure 8A:
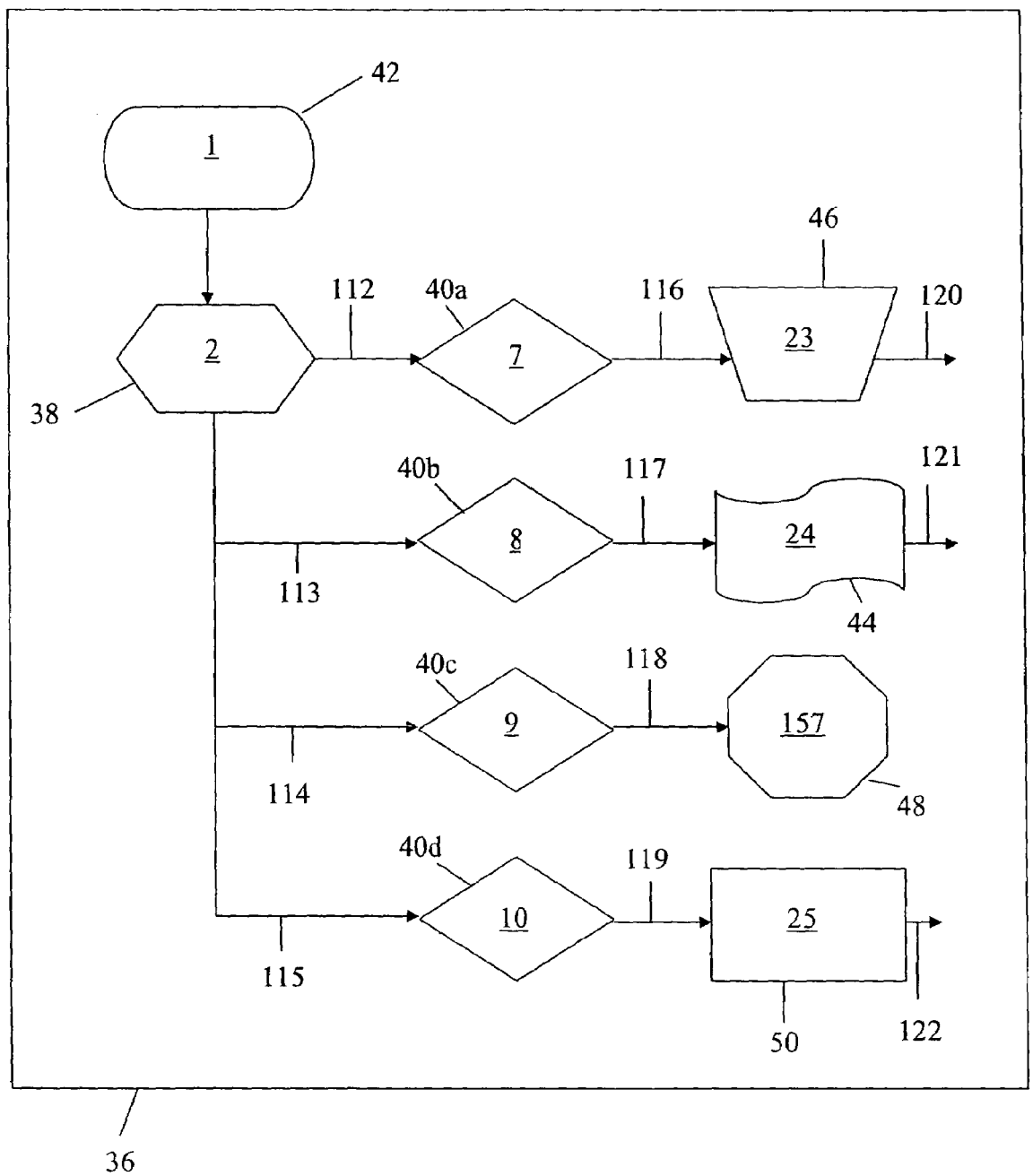
FIGS. 8a and 8b are schematic representations of further workflow documents for use in preferred embodiments of the present invention.
Figure 8B:
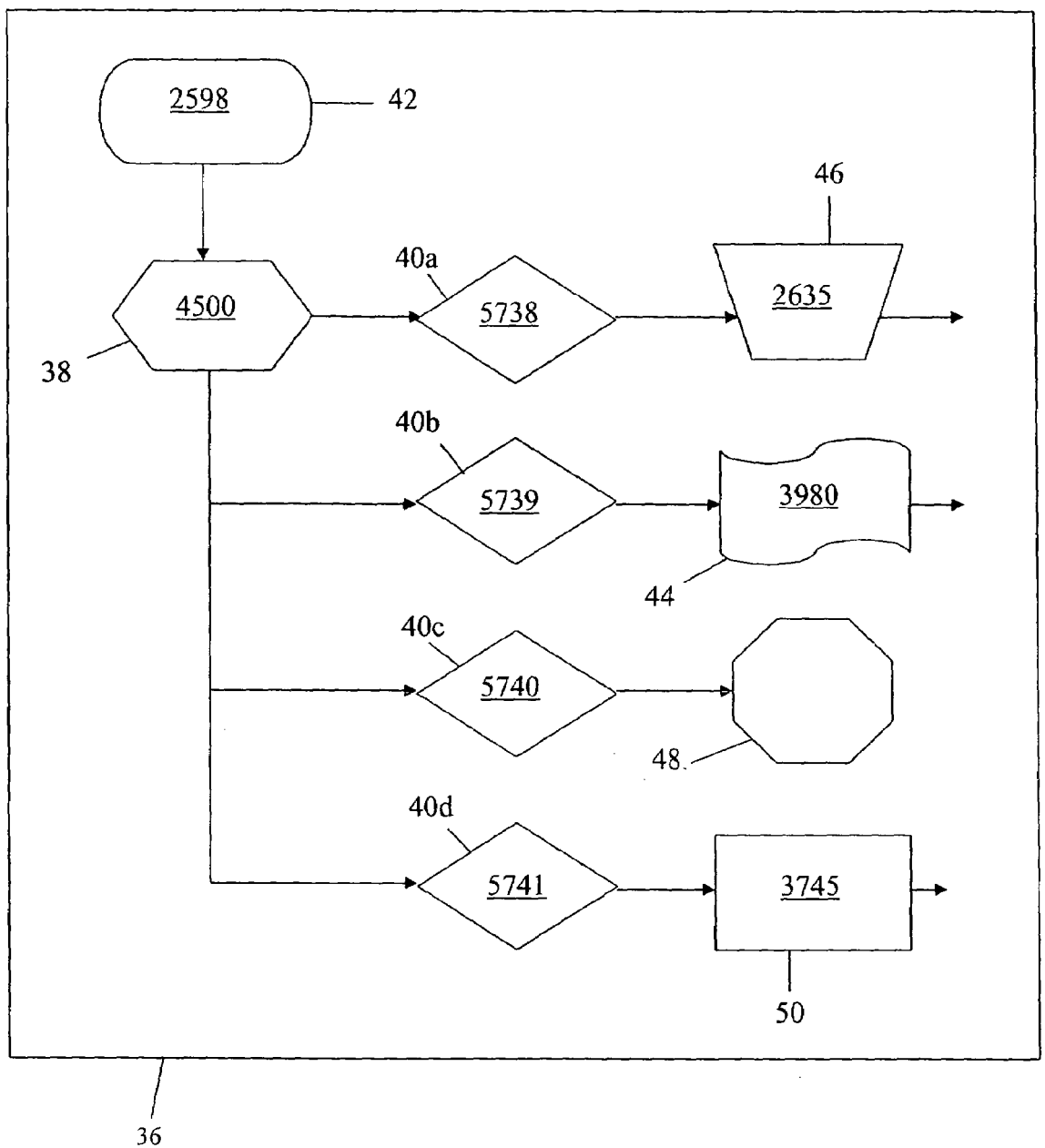

Referring firstly to FIGS. 8a and 8b, there are shown two different representations of a single workflow document 36 which comprises a start node 42, a single question node 38, and four answer nodes 40a to 40d. Looking at FIG. 8a, the question node 38 is connected to the four answer nodes 40a to 40d via respective connections 112, 113, 114 and 115. The first answer node 40a is connected to a transfer node 46 via a connection 116. The second answer node 40b is connected to a conclusion node 44 via a connection 117. The third answer node 40c is connected to a stop node 48 via a connection 118. The fourth answer node 40d is connected to a message node 50 via a connection 119. FIG. 8a also illustrates the unique node identifier of each node in the workflow document 36. Looking now at FIG. 8b, this figure shows the unique asset identifier of the asset 54 associated with each node of the workflow document 36 (apart from the stop node 48 which does not have an associated asset).

The conversion of the visual workflow document 36 into a data table 81 is carried out by an algorithm loader engine 99 (shown in FIG. 3) which is part of the Asset Builder 30. The conversion process is carried out by firstly creating an intermediate data table 83. This table 83 is shown in FIG. 8c and comprises four sections: the first section 83a comprises the table columns which specify information about the nodes and connectors of the workflow document 36, the second section 83b comprises the table columns which specify information about the assets associated with those nodes in the first section 83a, the third section 83c comprises the upper table rows which specify information about the nodes of the workflow document 36, and the fourth section 83d comprises the lower table rows which specify information about the connections of the workflow document 36.

More specifically, the first section 83a of this particular table 83 comprises five columns. The first column specifies the row number of the table 83, the second column specifies the node type (e.g. start, question, answer etc) of each node in the workflow document 36, and the fifth column specifies the node name and identifier of each node and each connection in the workflow document 36. The third and fourth columns respectively specify, for each connection in the workflow document 36, the node from which the connection is made (i.e. the current node), and the node to which the connection is made (i.e. the next node).

The second section 83b of the table 83 comprises five columns. The first column specifies the unique identifiers of the assets 54 associated with the start node 42 of the current workflow document 36 (i.e. the identifier of the workflow document itself), and the identifier of the workflow document associated with the transfer node 23 (i.e. the workflow document which is to be traversed when the transfer node 23 is encountered during the traversal of the current workflow document 36a). The second column specifies the unique identifiers of the assets 54 associated with the question and message nodes 38 and 50 of the workflow document 36. The third column specifies the unique identifiers of the assets 54 associated with the four answer nodes 40 of the workflow document 36. The fourth column specifies the unique identifiers of the assets 54 associated with the transfer nodes 46, and the fifth column specifies the unique identifiers of the assets 54 associated with the conclusion and stop nodes 44 and 48 of the workflow document 36.

Once the intermediate database table 83 has been created, it is converted into a further database table 81 using the Algorithm Loader Engine 99. The further database table 81 is shown in FIG. 8d and represents the interconnectivity of the workflow nodes in a more compact format than the database table 83 shown in FIG. 8c and, for the workflow document 36 shown in FIGS. 8a and 8b, comprises only five columns and ten rows. The further database table 81 basically orders the information about the nodes in the workflow document 36 into pairs to represent the interconnectivity of the nodes in the document 36, and therefore the possible logic pathways that can be taken in the document 36.

Looking firstly at the rows of the table 81, the first row specifies information about the start and question node pair 42 and 38. The second row of the table specifies information about the question node 38 of the workflow document 36, and is the only row that does not specify information about a node pair. There are then a further four rows in the table 81, which each specify information about the four question and answer node pairs 38 and 40a, 40b, 40c and 40d of the workflow document 36. The last four rows of the table 81 respectively specify information about the answer and transfer, conclusion, stop and message node pairs 40a and 46, 40b and 44, 40c and 48, and 40d and 50 of the workflow document 36.

Looking now at the columns of the table 81, the first column specifies the asset number of the workflow document 36 itself which is the same as that of the start node 42. The second column specifies the unique node identifier of the first (i.e. current) node of each node pair.

The third column of the table 81 specifies different information, depending on the node type. For the single question node 38, the third column specifies the asset number of the question asset 54 associated with that node 38. However, for the node pairs, the third column specifies the asset number of the asset 54 associated with the second (i.e. next) node of each node pair. For example, for a question and answer node pair, the third column specifies the unique identifier of the answer asset 54 associated with the answer node. The fourth column of the table specifies the node identifier of the next node of each node pair. The fifth column of the table 81 specifies the node type of the next node for the node pairs, and the current node for the single question node.

Once the compact database table 81 has been created, it is stored at the data store 22 so that it may be accessed by the server 14 for use in the expert tool 20 and expert system 28. Prior to storing the simplified database table 81 in the data store 22, the algorithm loader engine 99 of the Asset Builder 30 can be used to check the database table 81 for inconsistencies in the logic therein.

As well as enabling the creation etc of assets 54, the Asset Builder 30 may also be used to validate the structure of a workflow document 36. That is, to check that each answer asset 54 is associated with a question asset 54, and that each question is connected to the correct type of asset 54.

To ensure that the correct expert advice is given to the end-user 52, the expert tool 20 may be used to carry out a testing process on the created workflow documents 36 to ensure that the logic flow of the documents is correct. This function is carried out by the Expert Tester module 34 which is now described in detail.

The Expert Tester 34 traverses a workflow document 36 using a fictitious or dummy end-user 52, and provides for assets 54 to be edited during the test traversal process. The Expert Tester 34 also implements a pathfinder function which highlights logic paths in a workflow document 36 so that inconsistencies in the logic of the workflow may easily be seen and quickly identified by the user 26 during the testing process. It can also generate a test report of the traversal, the report including all the questions displayed to the dummy end-user 52 during the traversal process, and all the answers given by, and the conclusion presented to, the end-user 52.

Figure 9:
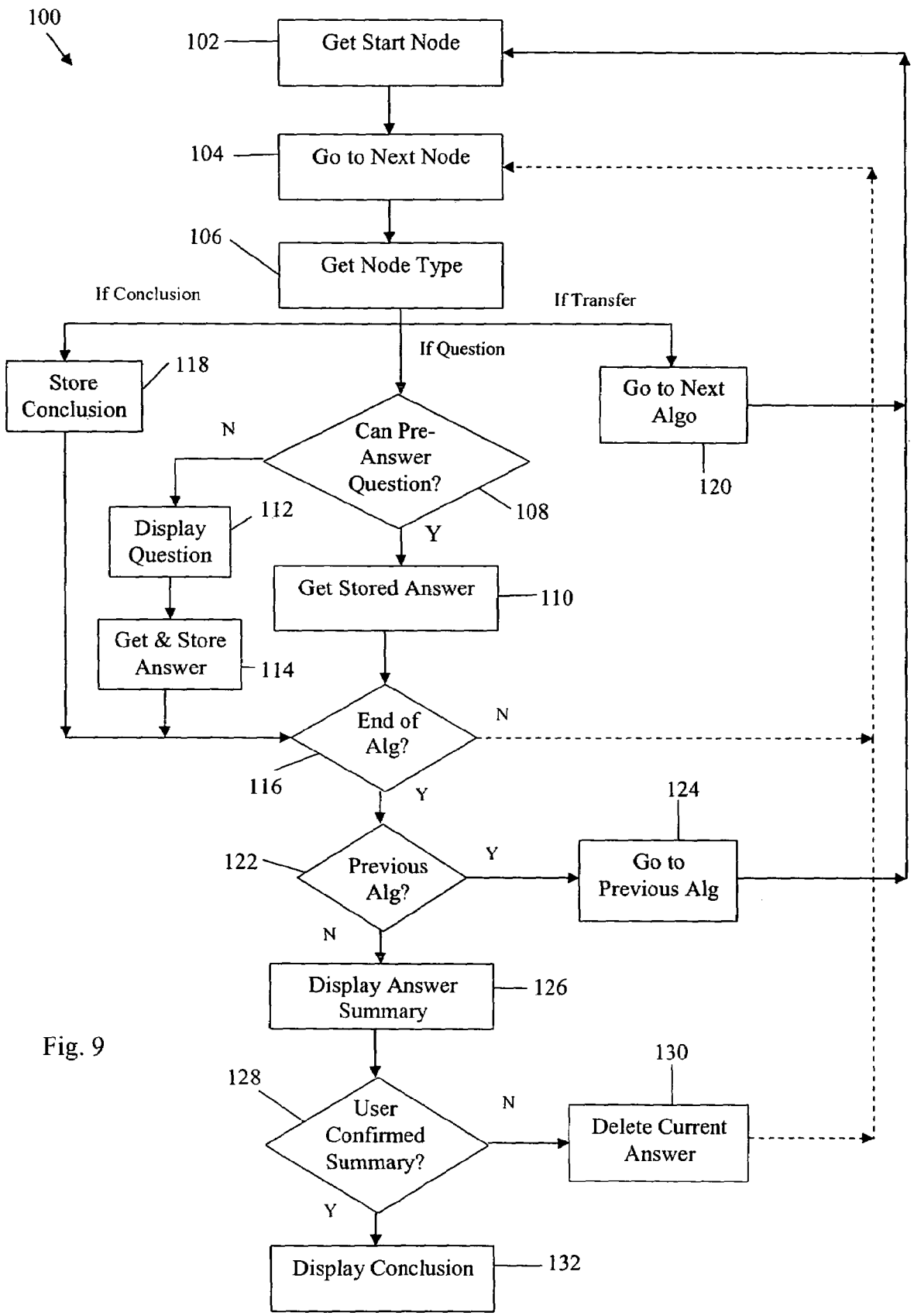
FIG. 9 is a flow diagram showing the method steps of traversing a workflow document, according to preferred embodiments of the present invention.

The traversal engine 29 of the Expert Tester 34 traverses the nodes of a workflow document 36 in order to present the end-user 52 with the appropriate questions so that the correct conclusions are arrived at in the light of the answers given to those questions. More particularly, the traversal engine 29 traverses the nodes of the workflow document 36 by processing the compact database table 81. The method 100 of processing the compact database table 81 is now described with reference to the flow diagram shown in FIG. 9.

The method 100 commences with the traversal engine 29 accessing at Step 102 the first row of the table 81 to get the start node 42 of the workflow document 36. The traversal engine 29 then gets at Step 104 the identifier of the next node of the start and question node pair from the "next node" column of the first row of the table 81. The identifier of the next node is two, and so the traversal engine 29 goes to the first row of the table 81 having a node with a node identifier equal to two (i.e. row two), and obtains at Step 106 the node type of node two, which is now the current node. The traversal engine 29 then goes to the "next node type" column of the table 81 to check the node type of the current node. In this case, the node is a question node 38 which is associated with a question asset 54 having the unique identifier 4500 (as can be seen from the "asset ID" column of the table 81).

As the current node is a question node 38, the traversal engine 29 then sends at Step 108 a request to the data store 22 to check whether an answer to the question having the identifier 4500 is stored therein. If it is, the traversal engine retrieves at Step 110 the stored answer from the data store 22 so that the question can be pre-answered without being displayed to the end-user 52. If, however, the answer to the question is not stored in the data store 22, the question is presented at Step 112 to the end-user 52 and the answer to the question and the question itself are then stored at Step 114 in the data store 22.

Returning to Step 112, if the answer to the question is not stored in the data store, the traversal engine 29 can tell from the third to the sixth rows of the database table 81 that the question asset 54 associated with node two has four possible answers. As the identifier of each answer asset 54 is included in the table 81, the traversal engine 29 uses these identifiers to retrieve each answer from the data store 22. A Web page (not shown) is then created dynamically which includes the question and the four possible answers, and the Web page is then displayed to the end-user 52 in his or her Web browser 24. If, for example, the question is of the single answer type, the end-user 52 is then able to choose one answer from the four answers displayed in the Web page, and the question-answer pair stored at Step 114 at the data store 22.

The traversal engine 29 then checks at Step 116 whether the end of the database table 81 has been reached. If it has not, the next node is fetched at Step 104 from the database table 81, and the node type checked at Step 106. For example, if the end-user 52 has previously chosen the first answer associated with the first node 40*a* having the node identifier seven, the traversal engine 29 then goes to the next row of the database table 81 where the node identifier of the current node is seven (i.e. row seven) to get at Step 104 the next node. The node type is obtained from the next node type column of the seventh row of the database table 81, and in this case the next node is a transfer node. The traversal engine 29 then gets the asset identifier of the workflow document 36 associated with the transfer node from the Asset ID column of the current database table 81, and the traversal continues at Step 120 with the database table 81 associated with this new workflow document 36.

On the other hand, if the end-user 52 had chosen the second answer presented to him, the traversal engine 29 would have moved to the eighth row of the database table 81 which specifies information relating to an answer and conclusion node pair. The conclusion would then be stored at Step 118 in the data store 22.

If the end of the table 81 has been reached, the traversal engine 29 checks at Step 122 the data store 22 for a previous table. If a previous table is stored in the data store 22, the traversal engine retrieves at Step 124 this table and continues the traversal process with this new table. If no previous table exists, the traversal engine 29 gets at Step 126 from the data store 22 the answers which have been stored therein during the traversal process. A summary Web page (not shown) is then dynamically created from the retrieved answers and associated questions for display at Step 126 to the end-user 52. The end-user 52 can then review at Step 128 their answers to check that they are correct. If the end-user 52 wishes to change an answer, the answer is deleted at Step 130 and the associated question is re-asked. If the end-user 52 agrees with all the answers displayed on the summary Web page, a conclusions Web page (not shown) is dynamically created which includes the conclusion reached during the traversal process, and may include a summary of the answers given by the end-user 52. The conclusions Web page is then displayed at Step 132 to the end-user 52 thereby concluding the traversal process.

The pre-answering function of the expert tool 20 effectively reduces the number of connections required in a workflow document 36, and thus increases the efficiency of the expert tool 20 and resulting expert system 28 and makes them more user-friendly. To illustrate this point, consider now the first and second workflow documents 236 and 238 respectively shown in FIG. 10*a* and FIG. 10*b*. These workflow documents 236 and 238 look very different, but both may arrive at the same conclusions.

Figure 10A:
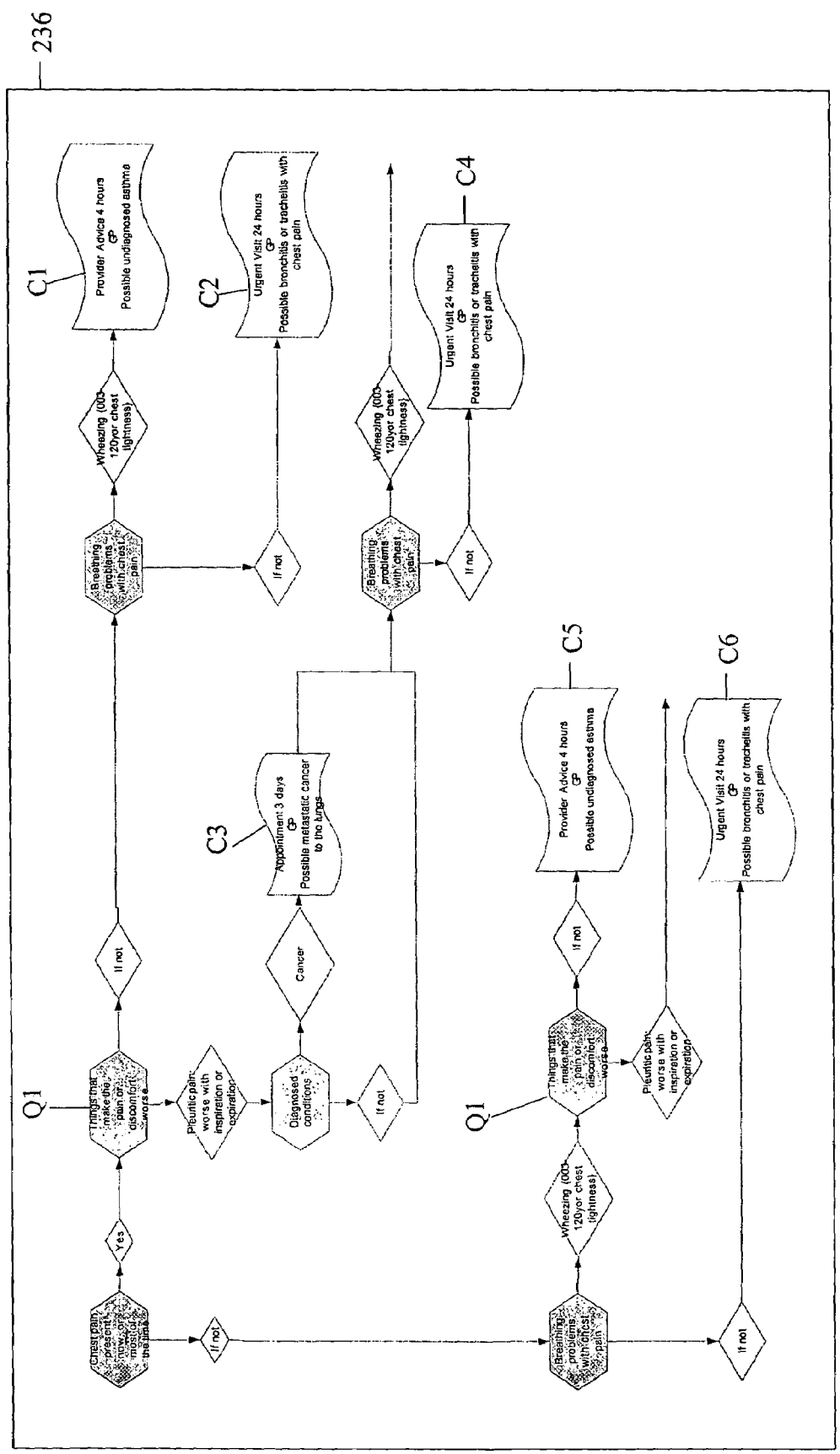
FIG. 10a is a workflow document that is not processed according to the present invention.

Referring firstly to FIG. 10*a*, this first workflow document 236 does not utilise the pre-answering function of the present invention. As a result, there are six conclusion nodes (C1 to C6) in this workflow document 36*a*: three of these conclusion nodes (C2, C4 and C6) are associated with an identical conclusion asset (i.e. Urgent Visit 24 hours GP), two of the other conclusion nodes (C1 and C5) are associated with another identical conclusion asset (i.e. Provider Advice 4 hours GP), and there is a single conclusion node (C3) associated with the a further conclusion asset "Appointment 3 days GP". To arrive at these three different conclusions, seven question nodes are provided, along with 12 answer nodes. It can also be seen from FIG. 10*a*, that 28 connections are required to provide the logic flow of this workflow document 236 to arrive at one of the three different conclusions.

Figure 10B:
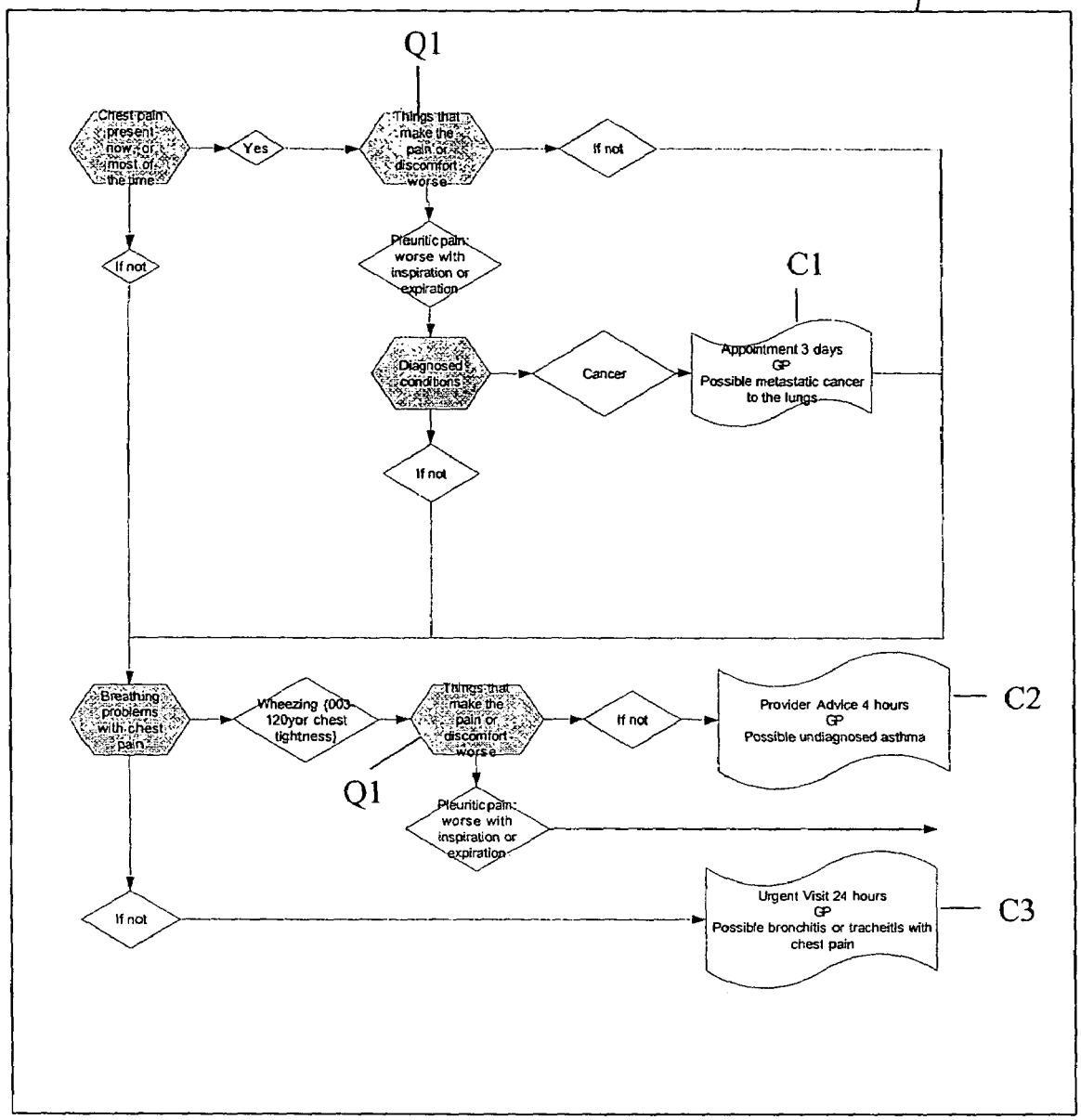
FIG. 10b is a workflow document that is processed according to the method shown in FIG. 9.

Referring now to FIG. 10*b*, the second workflow document 238 shown here utilises the pre-answering function of the present invention. As a result, it includes the same three conclusion assets as in the workflow document 238 of FIG. 10a, but only uses three conclusion nodes (C1 to C3), five question nodes, ten answer nodes, and only 20 connections.

The result of reducing the number of nodes in the second workflow document 238 is that some of the questions may need to be repeated. For example, in the first and second workflow documents 236 and 238 shown above, the question Q1 "Are there things that make the pain or discomfort worse?" may be asked twice during a single traversal of the second workflow document 238, as opposed to only once during the traversal of the first workflow document 236. However, the first time this question is asked of the end-user 52 during the traversal of the second workflow document 238, his answer and the associated question are stored in the data store 22, and the traversal engine checks the data store 22 for this answer if the same question is encountered during the traversal. If the answer is stored in the data store 22, the traversal engine 29 retrieves it and uses it to answer the question Q1, without having to display the question to the end-user 52 for a second time.

Without the pre-answering function, every single combination of questions and answers has to be explicitly provided in a workflow document 36. This increases the complexity of the workflow document 36, leading to increased possibility of errors appearing in the logic flow. Moreover, the higher the number of connections in a workflow document 36, the longer the time required to convert each workflow document 36 into the database tables 81 and 83. Due to the higher number of connections in the more complex workflow document 36a, the database tables 81 and 83 will be larger than for the workflow document 36b that utilises the pre-answering function, and will therefore require additional storage capacity at the data store 22.

Another feature that reduces the size of a workflow document 36 is the IF NOT answer. The IF NOT answer can be substituted for any answer, or group of answers, such that the traversal engine 29 will always take the IF NOT path if none of the other answers shown has been reached on a previous asking of the same question, or if the question has never previously been asked.

Now the expert system 28 itself will be described. The expert system 28 functions in a very similar manner to the Expert Tester 34. That is, it uses the traversal engine 29 to carry out the previously described method 100 to traverse workflow documents 36 via simplified database tables 81. The expert system 28 displays questions to the end-user 52 via Web pages which are dynamically created by appropriate software at the server computer 14. The expert system 28 also provides a natural language function which can be set by the user 26. This function identifies whether or not the user him or herself is carrying out an assessment, and the question is addressed appropriately in either the second or third person.

The expert tool 20 may be used to build a symptom assessment expert system 28 for assessing the symptoms of an end-user 52. To build this system, the user 26 must create the appropriate question, answer and conclusion assets 54, and also the workflow documents 36 which contain possible logic pathways to link the questions and answers to provide expert advice (i.e. conclusions) in the manner previously described. The symptom assessment expert system 28 is then able to provide a virtual doctor which assesses symptoms, suggests possible diagnoses, recommends when to seek care and what the end-user 52 can do for him or herself at home. The symptom assessment expert system 28 is provided on the server computer 14, and is accessed by the end-user 52 on a remote client computer 12a via the Internet.

Figure 11:
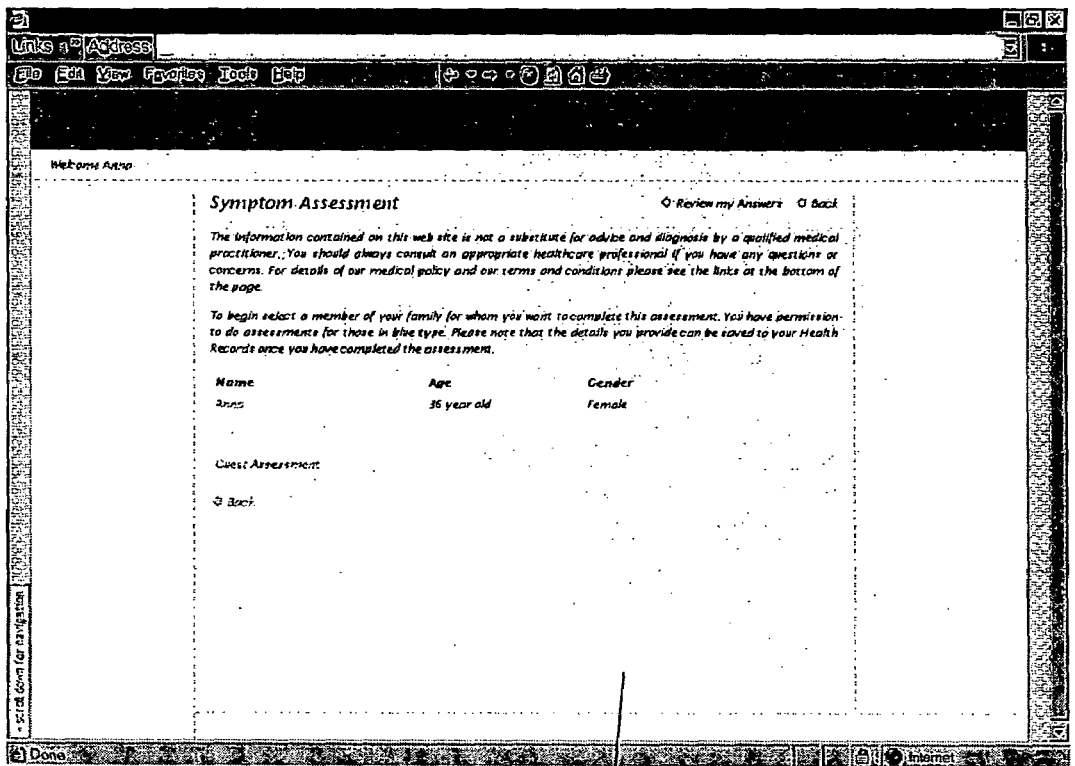
FIG. 11 is a screenshot of the symptom assessment home page of the expert system produced by the expert tool of FIG. 3.

To illustrate the resulting symptom assessment expert system 28, consider that the end-user is a 30 year old female who is experiencing back pain. She does not have time to visit her GP, and so decides to use the symptom assessment expert system 28 to try and find out the cause of her problem, and the action she should take. To access the expert system 28, the end-user 52 firstly enters the appropriate URL in her Web browser 24. She then registers with the expert system 28, entering her personal details such as her name, address and age. A patient history record 134 for this end-user 52 is then created at the data store 22, and her personal details are written to this record 134. Once she has registered with the expert system 28 (or has logged on to the system 28 if she is already registered), the symptom assessment home page 200 shown in FIG. 11 is displayed in her Web browser 24. This Web page 200 asks the end-user 52 to confirm her personal details, and to confirm that the symptom assessment is for her. If the end-user 52 confirms this, then the expert system 28 knows to use her personal data from her patient history record 134 for the symptom assessment, and the first symptom assessment Web page 202 is displayed (see FIG. 12).

Figure 12:
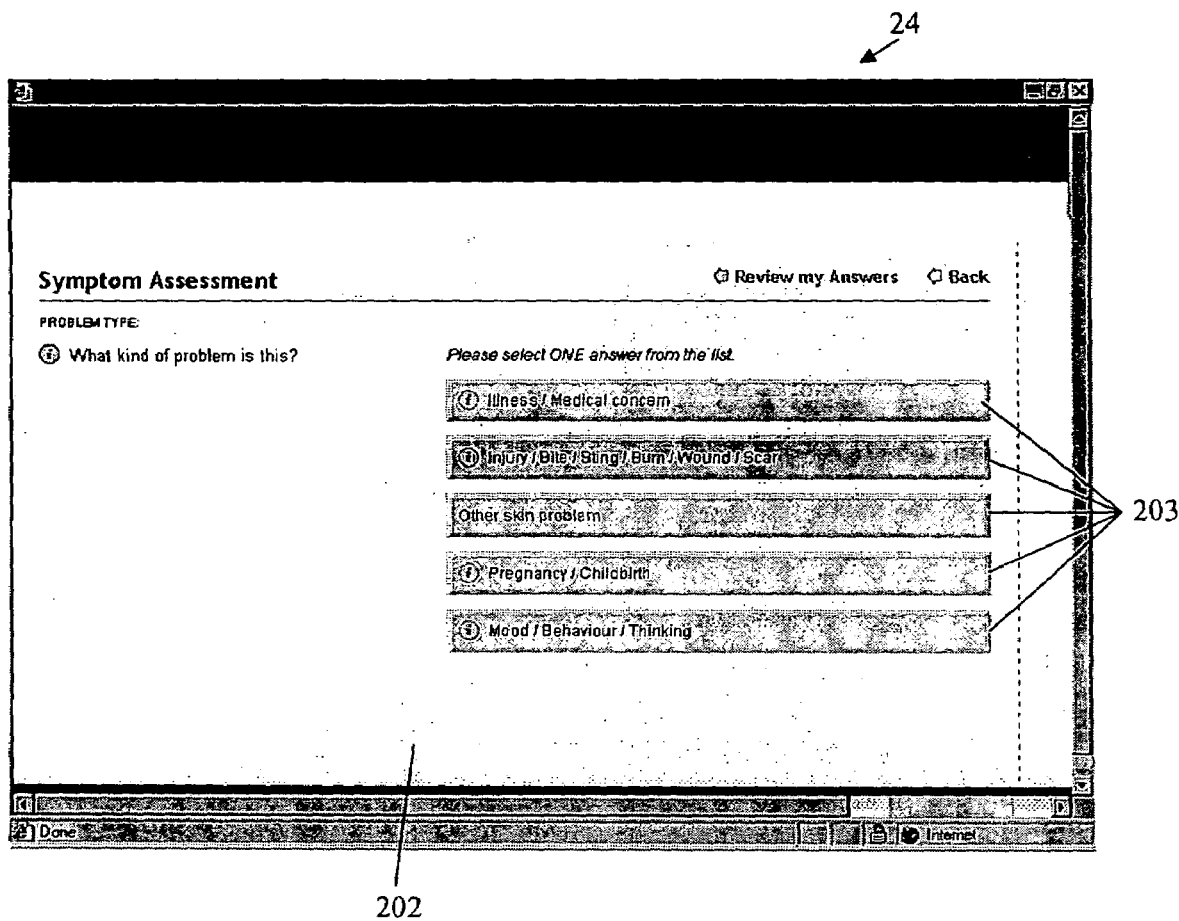
FIGS. 12, 13 and 14 are screenshots of problem type pages of the expert system of produced by the expert tool of FIG. 3.

Referring to FIG. 12, this Web page 202 asks the question "What kind of problem is this?", and presents the end-user 52 with the following five possible answers which are each represented by an answer button 203 displayed on the page 202. The end-user 52 may select one of the following answers by clicking on the appropriate answer button 203: 1) Illness/medical concern; 2) Injury/bite/sting/burn/wound/scar; 3) Other skin problem; 4) Pregnancy/childbirth; and 5) Mood/Behaviour/Thinking.

In order to select which answers are presented to the end-user on this Web page 202, a number of silent questions are asked by the expert system 28. The first silent question is "Is the user male or female?", and the second question is "If the user is female, is she of child-bearing age?". The traversal engine 29 of the expert system 28 retrieves the answers to these questions from the end-user's personal history record 134 stored at the data store 22, and silently answers the questions without presenting them to the end-user 52. Thus, if the answer to the first question was "male", the pregnancy/childbirth question would not be presented to the male end-user 52.

Figure 14:
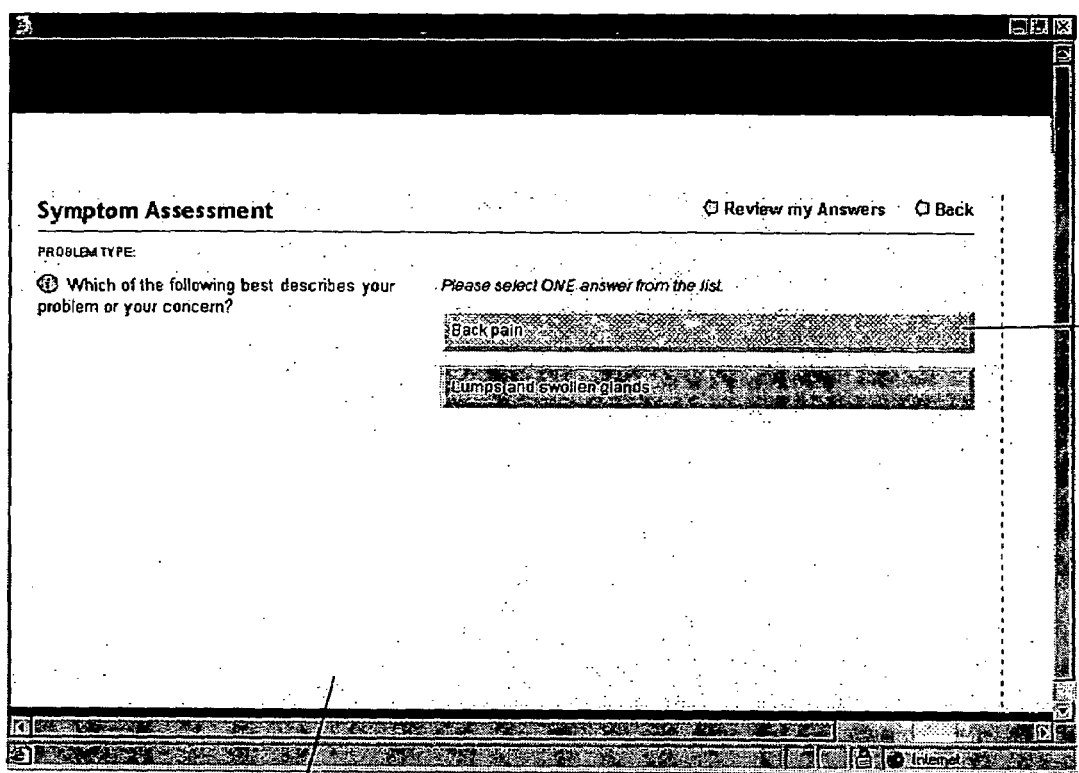
Figure 15:
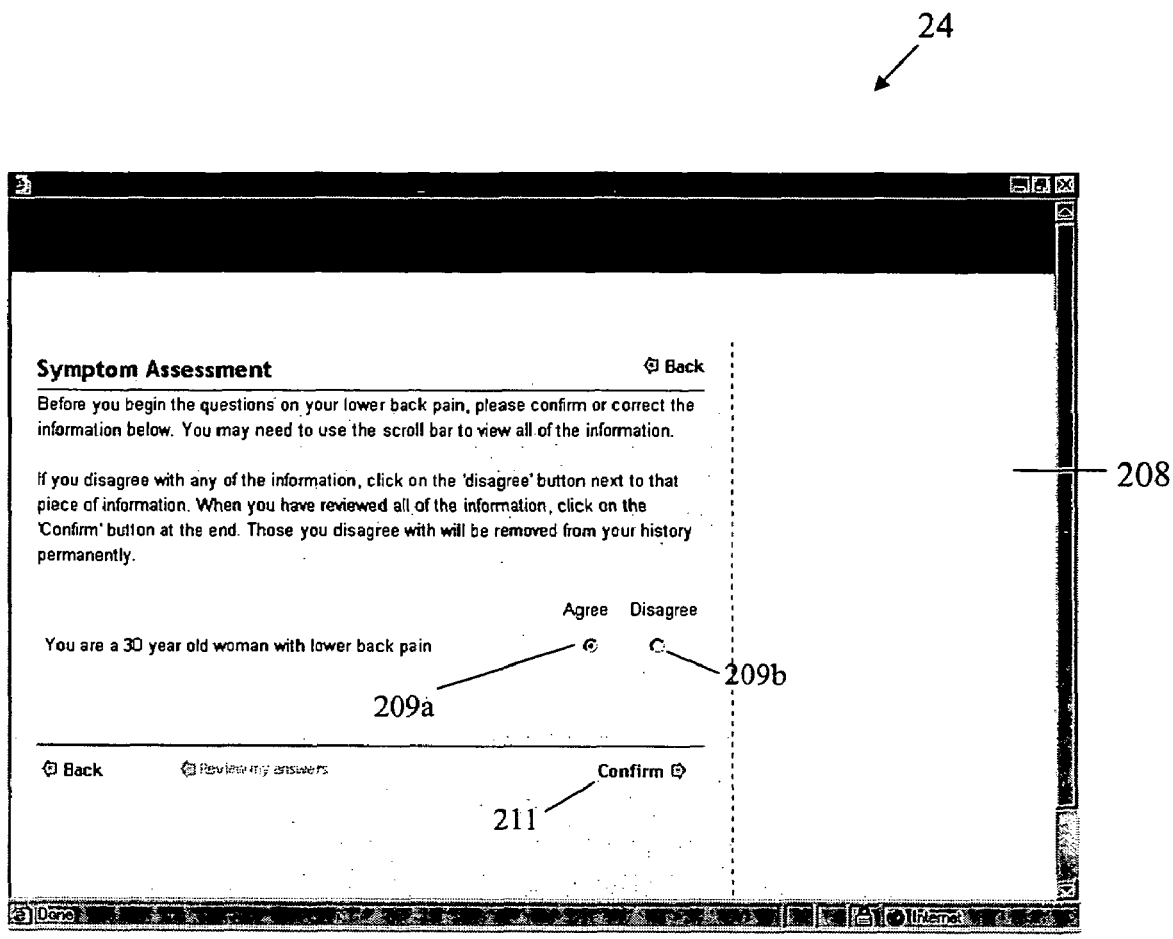
FIG. 15 is a screenshot of an interim summary page of the expert system produced by the expert tool of FIG. 3.

As the end-user 52 has back pain, she clicks on the "illness" answer button 203, and this results in the question and associated answer pair being stored in her personal history record 134 at the data store 22, and the Web page 204 of FIG. 13 being displayed. This Web page 204 presents the end-user 52 with front and rear views of a female body. The silent question and answering function is also used here: if the end-user 52 were male, a male body would be displayed in FIG. 13 instead of a female body. The end-user 52 is able to select an area of the displayed body with which she has a problem. In this case, she clicks on the lower back of the body which causes the Web page 206 shown in FIG. 14 to be displayed in her Web browser 24. This page 206 includes the question "Which of the following best describes your problem or concern?". The end-user 52 is able to select one answer from the list of "back pain" and "lumps and swollen glands". Upon clicking the "back pain" answer button 203, the question and associated answer are written to the end-user's personal history record 134, and the Web page 208 of FIG. 15 is displayed.

This Web page 208 presents a summary of the information obtained from the end-user 52 so far in the form of a question ("You are a 30 year old woman with lower back pain?") and two radio buttons 209a and 209b which correspond to two possible answers, "agree" or "disagree". If the end-user 52 agrees with this information, she clicks the "agree" radio button 209a, and then clicks on a confirm button 211 displayed at the bottom of the Web page 208. If the end-user 52 does not agree with this information, she can select the "disagree" radio button 209b, and the information will be deleted from her patient history record 134 and the questions previously presented will be presented to her again so that she can answer the questions differently, if necessary.

Figure 16:
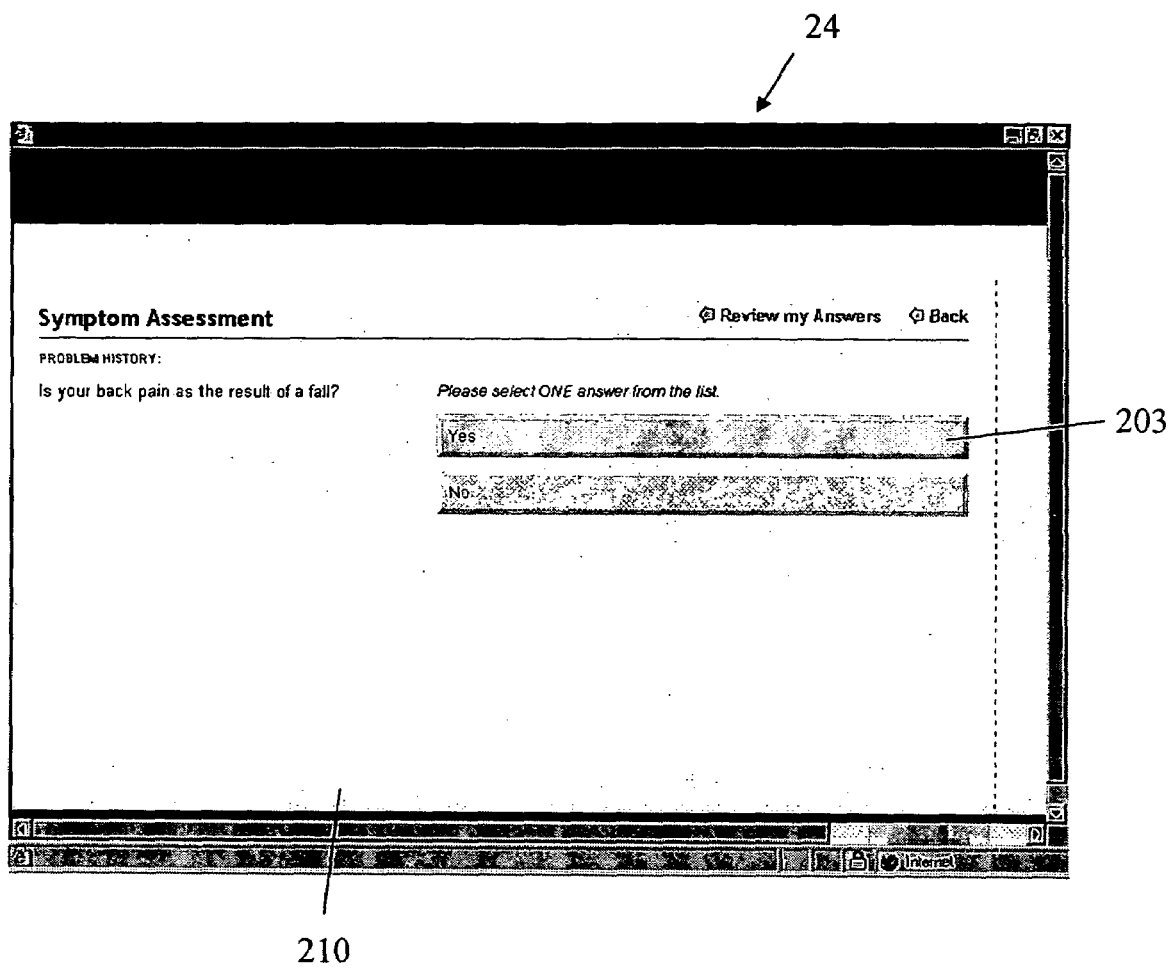
FIG. 16 is a screenshot of a problem history page of the expert system produced by the expert tool of FIG. 3.
Figures 17A, 17B:
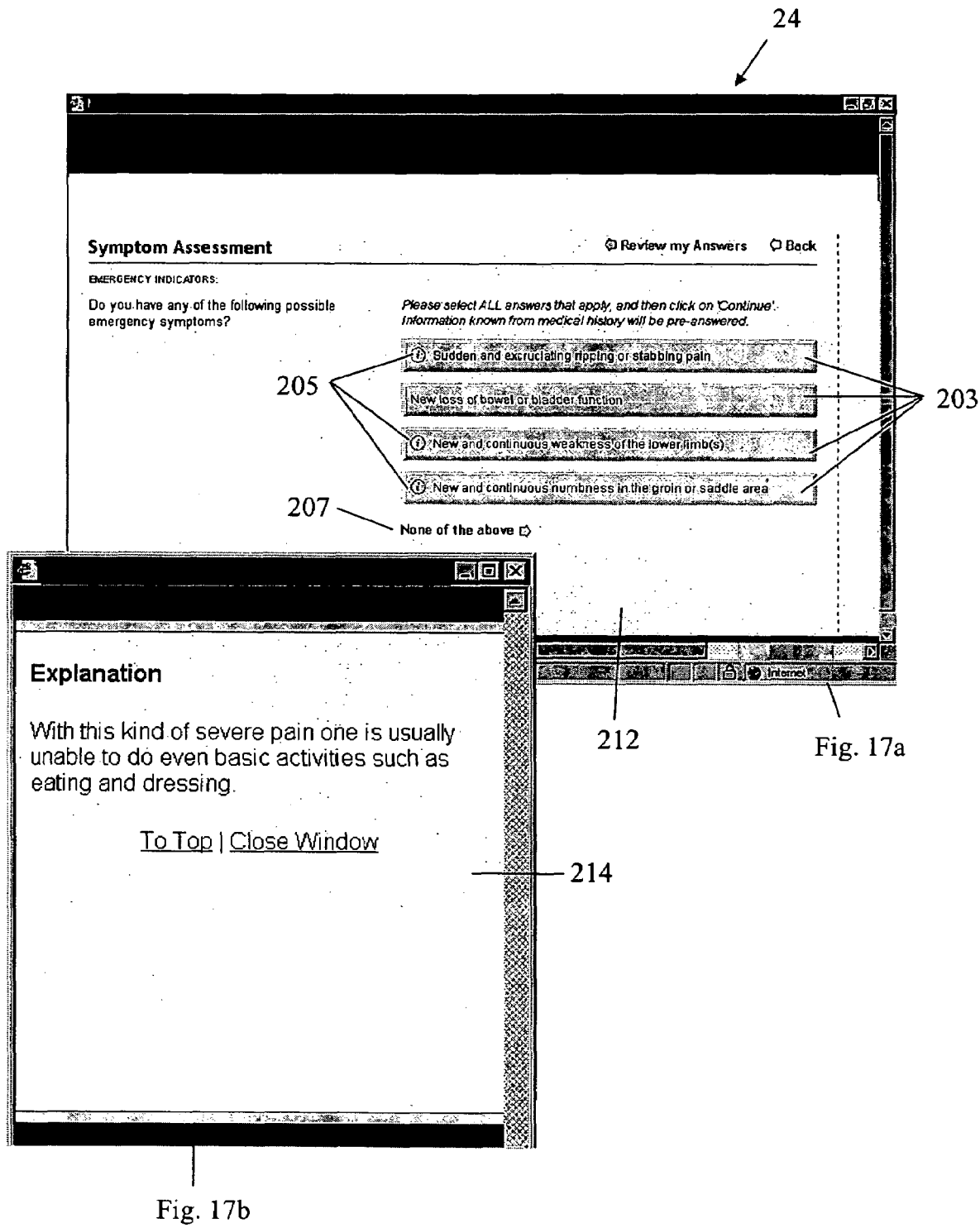

As the end-user 52 agrees with the displayed question, she clicks on the "confirm" button 211, and a first problem history Web page 210 (shown in FIG. 16) is displayed in her Web browser 24. This Web page 210 presents the question "Is your back pain the result of a fall?", and two possible answers, "yes" or "no". In this case, the end-user 52 answers yes by clicking on a "yes" button 203 displayed on the page 210. This causes the question and associated answer to be written to her personal history record 134, and the Web page 212 shown in FIG. 17a to be displayed. Note that every time the end-user 52 selects an answer, the answer and associated question (i.e. the question and answer pair) are written to the end-user's personal history record 134 by transmitting the question and answer pair to the data store 22 via, for example, the Internet 16.

The Web page 212 lists a number of emergency symptoms which may require urgent attention. This time, the end-user 52 may select all the answers that apply by clicking on the appropriate answer button(s) 203. If the end-user 52 has used the expert system 28 before and has provided a medical history, the act of selecting one or more answers will cause the traversal engine 29 to access the end-user's medical history (which is stored at the data store 22) to see whether any of the information stored therein can be used for pre-answering any of the questions that follow.

It can also be seen from the Web page 212 that some of the answer buttons 203 have a small information button 205 associated with them. For example, the top answer button 203 relates to "Sudden and excruciating ripping or stabbing pain". If the end-user 52 does not know the meaning of these terms, she may click on the associated information button 205 which causes the pop-up window 214 of FIG. 17b to be displayed which provides an explanation of the terms. In this example, the end-user 52 is not experiencing any of the emergency symptoms, and so she clicks on a "none of the above" button 207 provided at the bottom of the Web page 212. This leads to the displaying of a series of Web pages (not shown) similar to those already shown, which present the end-user 52 with a series of questions about her medical condition to which she provides answers, if appropriate.

When the end-user 52 has answered all the questions presented to her, and the end of the symptom assessment has been reached, the traversal engine 29 accesses the user's personal history record 134 and retrieves the questions that the end-user 52 has been asked along with their associated answers. The summary Web page 216 shown in FIG. 18 is then created at the remote server 14 using these questions and answers, and sent to the end-user's local client computer 10a and displayed in her Web browser 24. The end-user 52 is thus able to review her answers, going back to change those she does not agree with. If she agrees with all the information presented on the summary Web page 216, she clicks on the "confirm" button 211 displayed at the bottom of the summary Web page 216.

Using the end-user's answers to the questions that have been presented to her during the symptom assessment (and using those answers to questions which may have been obtained via the pre-answering function), the expert system 28 arrives at the conclusion that her lower back pain may be due to a strained or pulled muscle or ligament, or to bad posture whilst working at her computer. The Web page 218 shown in FIG. 19 is then created and displayed in the end-user's Web browser 52. The information presented on this Web page 218 informs the end-user 52 that her lower back pain should improve with home treatment, and gives care points to help relieve her symptoms. A link 217 to a reference on lower back pain is provided at the bottom of the Web page 218, together with an encyclopaedia link 219 on the same matter. Note that the answers provided by the end-user 52 to the questions determine the logic pathway taken through the workflow documents 36 associated with the symptom assessment expert system 28, and thus the conclusions reached and expert health information given to her.

Having described particular preferred embodiments of the present invention, it is to be appreciated that the embodiments in question are exemplary only, and that variations and modifications, such as those that will occur to those possessed of the appropriate knowledge and skills, may be made without departure from the spirit and scope of the invention as set forth in the appended claims. For example, it will be appreciated that the present invention is not restricted to implementation in a healthcare environment, but it may be applied to any environment where an interlinked series of questions, answers (and conclusions) in a workflow document to provide expert advice and information are required. For example, the present invention could be used as a complex machine fault diagnosis tool for determining a way of correcting a fault occurring in the machine. Furthermore, the present invention makes the process of creating and editing a workflow for a particular application far more easier for the user.

It is to be further appreciated that the present invention is deliverable on multiple electronic system types including, but not limited to, those discussed in this document. For example the technology may be implemented via the Web, multiple client-server applications, mobile phone and PDA.

The invention claimed is:

1. A method of traversing a workflow, the workflow comprising a plurality of interconnected question and answer nodes, each question node being linked to a respective stored pre-determined question and each answer node being linked to a respective stored answer, the method comprising:
   determining the type of the current node of the workflow and, if the current node is a question node, accessing a data store, ascertaining whether the data store contains a previously determined answer to the question linked to the current question node and,
   a) if the data store does contain such a previously determined answer, retrieving the answer from the data store and using the retrieved answer to determine the next node of the workflow to be traversed; and
   b) if the data store does not contain such a previously determined answer, presenting the question linked to the current question node to a user, and using answer data obtained from the user to determine the next node of the workflow to be traversed.

2. A method according to claim 1, wherein the presenting step further comprises presenting the question and one or more associated pre-determined answers to the user for user-selection to give the answer data.

3. A method according to claim 1, further comprising creating a viewing page for presenting the question and associated answer(s) to the user and for obtaining answer data.

4. A method according to claim 1, further comprising creating a personal history record for the user at the data store prior to commencing the traversal of the workflow that is pertinent to the upcoming traversal, the personal history record storing personal permanent or semi-permanent information regarding the user.

5. A method according to claim 4, further comprising storing question/answer data given by the user in the personal history record prior to and/or during the traversal of the workflow.

6. A method according to claim 5, wherein the storing step further comprises linking the answer data given by the user with the question presented to the user to generate a question and answer pair, and storing the question and answer pair in the personal history record.

7. A method according to claim 6, wherein the data store is remotely located from the user, and the storing step further comprises transmitting the question and answer pair to the data store via a communications network.

8. A method according to claim 6, wherein the accessing step comprises matching the question linked to the current question node with the question of each question and answer pair in the personal history record and, if there is a match, the retrieving step comprises retrieving the answer linked to the question of the matching question and answer pair to determine the next node of the workflow to be traversed.

9. A method according to claim 4, wherein the workflow further comprises at least one conclusion node connected to a respective at least one previous node, each conclusion node being associated with a respective stored conclusion specifying information according to the pathway taken through the nodes during the traversal of the workflow and if the current node is a conclusion node, the method further comprises storing the conclusion associated with the conclusion node in the personal history record.

10. A method according to claim 9, wherein the data store is remotely located from the user, and the storing step further comprises transmitting the conclusion to the data store via a communications network.

11. A method according to claim 9, wherein a question comprises a conclusion check question for checking whether a conclusion node has been reached, and the method further comprises referring to the personal history record to ascertain whether it contains a pre-stored conclusion in order to determine the next node of the workflow to be traversed.

12. A method according to claim 4, further comprising creating a viewing page comprising question and answer data from the personal history record for user-confirmation, and transmitting the viewing page to a client.

13. A method according to claim 12, wherein the viewing page is an editable data page, and the method further comprises deleting an answer from the personal history record via the data page, and re-commencing the traversal of the workflow from the question node associated with the deleted answer.

14. A method according to claim 13, further comprising receiving confirmation from the user, creating a viewing page comprising conclusion data from the personal history record, and transmitting the viewing page to the client.

15. A method according to claim 1, wherein the workflow further comprises at least one conclusion node connected to a respective at least one previous node, each conclusion node being associated with a respective stored conclusion specifying information according to the pathway taken through the nodes during the traversal of the workflow.

16. A method according to claim 15, wherein a single conclusion is associated with a plurality of conclusion nodes of the workflow(s).

17. A method according to claim 1, wherein the workflow further comprises at least one termination node connected to a respective at least one previous node, and the method further comprises repeating the determining, accessing and retrieving or presenting steps until a termination node is reached.

18. A method according to claim 1, wherein the workflow further comprises at least one message node connected to a respective at least one previous node and, if the current node is a message node, the method further comprises sending a message to the user prior to the continuation of the traversal of the workflow.

19. A method according to claim 1, wherein the workflow comprises a plurality of linked workflows.

20. A method according to claim 19, wherein the workflow further comprises at least one transfer node connected to a respective at least one previous node and, if the current node is a transfer node, the method comprises terminating the traversal of the current workflow and carrying out the traversal of another, linked workflow.

21. A method according to claim 20, further comprising returning to the traversal of the previous workflow upon the termination of the traversal of the current workflow.

22. A method according to claim 1, wherein a single pre-determined question or pre-determined answer is associated with a plurality of question and answer nodes of the workflow(s).

23. A method according to claim 1, wherein the workflow(s) comprises a document containing a visual representation of the nodes and their interconnections.

24. A method according to claim 23, wherein the workflow document comprises a Microsoft Visio drawing.

25. A method according to claim 23, wherein the workflow(s) comprises a database table containing a representation of the nodes and their logic interconnections and the method further comprises converting the visual representation of the workflow to a database table prior to carrying out the traversal of the workflow.

26. A method according to claim 1, wherein the workflow(s) comprises a database table containing a representation of the nodes and their logic interconnections.

27. A data carrier comprising a computer program arranged to configure a computer to implement the method according to claim 1.

28. A system for traversing a workflow comprising a plurality of interconnected question and answer nodes, each question node being linked to a respective stored pre-determined question and each answer node being linked to a respective stored answer, the system comprising:

display means for presenting a question to a user;
  traversal means arranged to retrieve a node of the workflow, to determine the type of the current node and, if the current node is a question node, to access a data store, and to ascertain whether the data store contains a previously determined answer to the question linked to the current question node and,
  a) if the data store does contain such a previously determined answer, to retrieve the answer and use the retrieved answer to determine the next node of the workflow to be traversed; and
  b) if the data store does not contain such a previously determined answer, to present the question linked to the current question node to the user via the display means, and to use answer data obtained from the user to determine the next node of the workflow to be traversed.

29. A system according to claim 28, further comprising a library of pre-determined questions, answers and conclusions.

30. A system according to claim 29, wherein the library includes at least one previously determined possible answer for a pre-determined question.

31. A system according to claim 30, wherein each pre-determined question, answer, and conclusion may be re-used in different workflows.

32. A system according to claim 29, wherein pre-determined questions and answers are independent of one another.

33. A system according to claim 32, wherein each pre-determined question, answer, and conclusion may be re-used in different workflows.

34. A system according to claim 28, further comprising a server operably connected to the data store.

35. A system according to claim 34, wherein the server comprises the traversal means.

36. A system according to claim 34, wherein the data store comprises the traversal means.

37. A system according to claim 34, wherein the server comprises an application for integrating assets in workflow documents.

38. A system according to claim 28, further comprising a personal history record for the user arranged to store personal permanent or semi-permanent information regarding the user.

39. A system according to claim 28, wherein question and associated pre-determined answers are stored as question and answer pairs in the data store.

40. An apparatus for constructing an interactive workflow document comprising questions, answers and conclusions, the apparatus comprising:
specifying means for specifying question, answer and conclusion data as reusable respective question, answer and conclusion assets of the workflow;
a data store for storing the reusable question, answer and conclusion assets;
selecting means enabling user selection of a graphical representation of the type of asset required as a node of a graphical workflow, the type determining how the asset is handled;
associating means for associating an actual asset of the specified type with each graphical node representation;
layout means arranged to enable the user to graphically position each of the selected assets on a layout page; and
connecting means arranged to enable user construction of the logical connections between the selected nodes on the layout page, the connected together nodes providing a graphical representation of the interactive workflow document.

41. An apparatus according to claim 40, further comprising classifying means arranged to classify each question, answer and conclusion asset and to provide assistance in user selection of a particular asset from consideration of the asset's classification.

42. An apparatus according to claim 41, wherein the stored assets within the data store comprise a library of assets, each asset being classified for ease of retrieval.

43. An apparatus according to claim 41, wherein the specifying means comprises a graphical user interface having a portion showing the classifications of the stored assets and being arranged to enable selection of an asset from consideration of the classifications.

44. An apparatus according to claim 40, further comprising assignment means for assigning a unique identifier (asset identifier) to each question, answer and conclusion asset.

45. An apparatus according to claim 44, wherein the assigning means is arranged to assign a unique identifier (node identifier) to each graphical node representation and each logical connection between nodes.

46. An apparatus according to claim 40, further comprising converting means for converting the graphical representation of the workflow into a table of identifiers specifying the workflow completely.

47. An apparatus according to claim 46, further comprising assignment means for assigning a unique identifier to each node and asset of the workflow wherein the converting means is arranged to compile a table detailing, for each node in the workflow, the node type, the node identifier, the asset identifier associated with the node and all the connections from that node.

48. An apparatus according to claim 47, wherein the optimising means orders the information contained in the table of identifiers by node pairs to represent the interconnectivity of the nodes within the workflow document.

49. An apparatus according to claim 48, wherein the optimising means converts the table of identifiers into an optimised table, the optimised table comprising, for each question/answer set, the node identifier of the question node, the asset identifier for all of the questions and answers, the node type for all of the assets in the node. Node identifiers for answers within the workflow document are replaced by the node identifier of the associated question therefore a question node comprises of both questions and answers.

50. An apparatus according to claim 46, further comprising optimising means for optimising the table of identifiers into a minimum format representing the connectivity between each pair of connected nodes.

51. An apparatus according to claim 40, wherein the selecting means is arranged to present to the user a plurality of different types of graphical representation of types of asset.

52. An apparatus according to claim 51, wherein the selecting means is arranged to present to the user one or more graphical representations of predetermined combinations of question and answer assets.

53. An apparatus according to claim 40, wherein the specifying means is arranged to retrieve an existing stored question, answer or conclusion asset and to enable the user to edit the asset.

54. An apparatus according to claim 40, wherein the specifying means comprises a graphical user interface.

55. An apparatus according to claim 54, wherein the graphical user interface is arranged to enable user addition, editing and deletion of the assets stored in the data store.

56. An apparatus according to claim 40, wherein the data store comprises at least one silent question asset which requires no user interaction to determine an associated answer.

57. An apparatus according to claim 40, wherein the data store comprises at least one silent conclusion asset which is for internal use within the apparatus and is not presented to the user.

58. An apparatus according to claim 40, further comprising creating means for creating a derived question asset from a value entry question asset, the creating means being arranged to create a question whose answer is determined by the value entry answer asset corresponding to the value entry question asset.

59. An apparatus according to claim 40, further comprising means for testing the constructed workflow document to confirm the logic associated with the user-determined connections.

60. An apparatus according to claim 40, wherein the data store is arranged to store the question and answer assets in pairs for the personal history record of the user.

61. An apparatus according to claim 40, wherein the data store is arranged to store at least some of the reusable question, answer and conclusion assets temporarily and to delete the reusable question, answer and conclusion assets after a given time period or event occurrence.

62. A method of constructing an interactive workflow document comprising questions, answers and conclusions, the method comprising:
- specifying question, answer and conclusion data as reusable respective question, answer and conclusion assets of the workflow;
- storing the reusable question, answer and conclusion assets;
- enabling user selection of a graphical representation of the type of asset required as a node of a graphical workflow, the type determining how the asset is handled;
- associating an actual asset of the specified type with each graphical node representation;
- enabling the user to graphically position each of the selected assets on a layout page; and
- enabling user construction of the logical connections between the selected nodes on the layout page, the connected together nodes providing a graphical representation of the interactive workflow document.

63. A data carrier comprising a computer program arranged to configure a computer to implement the method according to claim 62.

64. A workflow representation comprising a question node being linked to a respective stored pre-determined question and a plurality of answer nodes, each answer node having a direct link to the question node.

65. A workflow representation as claimed in claim 64, wherein more than one answer is possible in response to the question.

66. A workflow representation as claimed in claim 64, wherein the answer is numerical.

67. A workflow representation as claimed in claim 64, wherein possible answers to the question are represented in the form of a table.

68. A workflow representation as claimed in claim 67, wherein there is one possible answer per table row.

69. A workflow representation as claimed in claim 67, wherein there is more than one possible answer per table row.

70. A workflow representation as claimed in claim 64, wherein the answer comprises a free text field.

71. A workflow representation as claimed in claim 64, wherein possible answers to the question are represented as an image arranged such that an end user may select a portion of the image to answer the question.

72. A representation for a workflow, the workflow comprising a series of interconnected question nodes, answer nodes and conclusion nodes, each of the question, answer and conclusion nodes being associated with a respective question, answer and conclusion asset, the representation comprising a table of identifiers representing the connectivity between pairs of connected nodes.

73. A representation as claimed in claim 72, wherein each node and asset is associated with a unique identifier and wherein for any pair of connected nodes, the table details the node identifiers and the asset identifier and node type for both nodes.

74. A method of traversing a workflow, the workflow comprising a plurality of interconnected question and answer nodes, each question node being linked to a respective stored pre-determined question and each answer node being linked to a respective stored answer, the method comprising:
- creating a personal history record for the user at the data store prior to commencing the traversal of the workflow that is pertinent to the upcoming traversal, the personal history record storing personal permanent or semi-permanent information regarding the user
- determining the type of the current node of the workflow and, if the current node is a question node, accessing a data store, ascertaining whether the data store contains a previously determined answer to the question linked to the current question node and,
  - a) if the data store does contain such a previously determined answer, retrieving the answer from the data store and using the retrieved answer to determine the next node of the workflow to be traversed; and
  - b) if the data store does not contain such a previously determined answer, presenting the question linked to the current question node to a user, and using answer data obtained from the user to determine the next node of the workflow to be traversed,
- wherein (i) the workflow further comprises at least one conclusion node connected to a respective at least one previous node, each conclusion node being associated with a respective stored conclusion specifying information according to the pathway taken through the nodes during the traversal of the workflow and if the current node is a conclusion node, the method further comprises storing the conclusion associated with the conclusion node in the personal history record and (ii) a question comprises a conclusion check question for checking whether a conclusion node has been reached, and the method further comprises referring to the personal history record to ascertain whether it contains a pre-stored conclusion in order to determine the next node of the workflow to be traversed.

75. A method of traversing a workflow, the workflow comprising a plurality of interconnected question and answer nodes, each question node being linked to a respective stored pre-determined question and each answer node being linked to a respective stored answer, the workflow comprising a document containing a visual representation of the nodes and their interconnections, the method comprising:
- determining the type of the current node of the workflow and, if the current node is a question node, accessing a data store, ascertaining whether the data store contains a previously determined answer to the question linked to the current question node and,
  - a) if the data store does contain such a previously determined answer, retrieving the answer from the data store and using the retrieved answer to determine the next node of the workflow to be traversed; and
  - b) if the data store does not contain such a previously determined answer, presenting the question linked to the current question node to a user, and using answer data obtained from the user to determine the next node of the workflow to be traversed.

\* \* \* \* \*